US012790042B2

(12) United States Patent
Deliu

(10) Patent No.: US 12,790,042 B2
(45) Date of Patent: Nov. 10, 2026

(54) AERIAL VEHICLE CAPTURE DEVICE

(71) Applicant: DRONE BAND LTD, London (GB)

(72) Inventor: Constantin Gabriel Deliu, Surrey (GB)

(73) Assignee: DRONE BAND LTD, London (GB)

( * ) Notice: Subject to any disclaimer, the term of this patent is extended or adjusted under 35 U.S.C. 154(b) by 0 days.

(21) Appl. No.: 18/992,021

(22) PCT Filed: Jul. 6, 2023

(86) PCT No.: PCT/GB2023/051787

§ 371 (c)(1),
(2) Date: Jan. 7, 2025

(87) PCT Pub. No.: WO2024/013476

PCT Pub. Date: Jan. 18, 2024

(65) Prior Publication Data

US 2026/0015108 A1 Jan. 15, 2026

(30) Foreign Application Priority Data

Jul. 14, 2022 (GB) ..................................... 2210368

(51) Int. Cl.
*B64U 70/20* (2023.01)
*B64U 70/83* (2023.01)

(52) U.S. Cl.
CPC ............ *B64U 70/20* (2023.01); *B64U 70/83* (2023.01)

(58) Field of Classification Search
CPC ................................ B64U 70/20; B64U 70/83
See application file for complete search history.

(56) References Cited

U.S. PATENT DOCUMENTS

| | | | |
|---|---|---|---|
| 9,085,362 | B1 | 7/2015 | Kilian et al. |
| 10,435,153 | B2 | 10/2019 | Klein |
| 10,759,532 | B2 | 9/2020 | Zhang |
| 2016/0327945 | A1 | 11/2016 | Davidson |
| 2016/0376029 | A1 | 12/2016 | Sekiya |
| 2017/0144756 | A1 | 5/2017 | Rastgaar Aagaah et al. |
| 2017/0253348 | A1 | 9/2017 | Ashdown et al. |

(Continued)

FOREIGN PATENT DOCUMENTS

| | | | |
|---|---|---|---|
| CN | 205633051 | U | 10/2016 |
| CN | 107933915 | A | 4/2018 |

(Continued)

OTHER PUBLICATIONS

International Search Report and Written Opinion dated Sep. 22, 2023, issued in international application No. PCT/GB2023/051787.

(Continued)

*Primary Examiner* — Kimberly S Berona
*Assistant Examiner* — Steven J Shur
(74) *Attorney, Agent, or Firm* — Sughrue Mion, PLLC

(57) ABSTRACT

An aerial vehicle capture device (10) for capturing a target aerial vehicle (30) is provided. The capture device (10) includes a capture mechanism having at least one restraining arm (RA1-8). The at least one restraining arm (RA1-8) is deployed on contact of an associated capture trigger (14) with the target aerial vehicle (30). The at least one restraining arm (RA1-8) is deployed from a nominal condition to a capture condition on contact of the associated capture trigger (14) with the target aerial vehicle (30) to restrain the target aerial vehicle (30).

18 Claims, 20 Drawing Sheets

(56) References Cited

U.S. PATENT DOCUMENTS

| | | | | |
|---|---|---|---|---|
| 2017/0355461 | A1 | 12/2017 | Naito et al. | |
| 2017/0356726 | A1 | 12/2017 | Theiss et al. | |
| 2018/0105271 | A1* | 4/2018 | Wypyszynski | B64U 10/13 |
| 2018/0224262 | A1 | 8/2018 | Klein | |
| 2019/0112045 | A1* | 4/2019 | Zhang | B64U 70/20 |
| 2020/0183429 | A1 | 6/2020 | Ottenheimer | |
| 2021/0240207 | A1* | 8/2021 | Gury | B64D 7/00 |
| 2022/0097847 | A1 | 3/2022 | Hodges et al. | |

FOREIGN PATENT DOCUMENTS

| | | | |
|---|---|---|---|
| CN | 111619805 | B | 11/2021 |
| CN | 113879537 | A | 1/2022 |
| DE | 102015003323 | A1 | 9/2016 |
| DE | 102019114000 | A1 | 11/2020 |
| EP | 3922551 | A1 | 12/2021 |
| KR | 101830880 | B1 | 2/2018 |
| KR | 102152739 | B1 | 9/2020 |

OTHER PUBLICATIONS

Search Report dated Jan. 5, 2023, issued in British application No. GB2210368.3.

* cited by examiner

AERIAL VEHICLE CAPTURE DEVICE

CROSS REFERENCE TO RELATED APPLICATIONS

This application is a National Stage of International Application No. PCT/GB2023/051787, filed on Jul. 6, 2023, which claims priority from British Patent Application No. 2210368.3, filed on Jul. 14, 2022.

FIELD OF INVENTION

This invention relates to the field of flying devices, such as drones.

BACKGROUND

Drones, quadcopters, unmanned aerial vehicles (UAVs) and other flying devices are becoming more and more popular and, although authorities have tried to regulate them, enforcing lawful use has been hard, if not impossible. In December 2018, several drones entered Gatwick Airport airspace unlawfully forcing closure of the airspace several times. Other than by seeking to enforce exclusion zones around UK airports, the authorities have not found a safe way to effectively deal with these airspace violations.

A number of drone capture vehicles or devices have been proposed. U.S. Pat. No. 10,759,532 discloses a carrier vehicle which has foldable arms arranged in front of the vehicle. The carrier vehicle flies towards the target capturing it within the net. The folding arms and the deployment of the net are relatively complex. The net may readily entangle itself. Furthermore, a large carrier vehicle may be required in order to transport the captured target to a safe location. EP3922551A discloses a device for capturing a target such as a drone and a capture system comprising a drone provided with such a capture device which uses a carrier vehicle e.g., a drone, which tows a circular net mid-flight behind carrier vehicle. The carrier vehicle flies towards the target and tries to catch it in the net deployed behind the carrier vehicle. It then releases the captured target in a safe landing area. The device has several disadvantages. The use of a net may affect manoeuvrability as it may affect both the centre of gravity and the centre of lift for the carrier vehicle and capture device assembly. Because the net is dragged behind the capture vehicle it may be difficult to follow an agile target. Net deployment is relatively complex, and the net may easily entangle itself. Finally, a large carrier vehicle may be required in order to transport the captured target to a safe location. KR101830880 discloses a capture drone for capturing unlicensed drones which uses a carrier vehicle with a number of lines on a beam below the carrier vehicle. The carrier vehicle flies towards the target and tries to catch the target in the trap lines. The use of trap lines may affect manoeuvrability as it could affect both the centre of gravity and the centre of lift for the carrier vehicle and capture device assembly. Because of the acrobatic manoeuvres required when following an agile target, the trap lines could pose a danger to the carrier device Finally, a large carrier vehicle may be required in order to transport the captured target to a safe location. US2022097847 discloses a purpose-built drone that has a net/basket/mesh in the centre which captures the target from underneath trapping it in the net/basket/mesh. This may have several disadvantages. The use of a net/basket/mesh may limit manoeuvrability. When using a flexible net/basket/mesh the acrobatic manoeuvres required when following an agile target may cause self-damage. Trapping a target from underneath may be difficult if the target is fast and agile. The purpose-built drone may be required to be much larger than the target in order to transport the target once it has been captured to a safe location. US2020183429A1 describes an approach to the detection, control, and the use of drone swarms which uses an entanglement device (e.g., a net) strung between a subset of drones of the drone swarm. The capture of the target is to be performed by flying the drone swarm towards the target capturing it in the "entanglement device". This approach may have several disadvantages. The use of an "entanglement device" may limit the manoeuvrability of the assembly. Because of the acrobatic manoeuvres required when following an agile target, the "entanglement device" could pose a danger to the drone swarm. A large amount of energy may need to be used to keep the "entanglement device" strung between the drones of the swarm. KR102152739 discloses a carrier vehicle which uses a compression tank that can fire a capture net when triggered and captures the target by flying towards it and firing the capture net towards the target when in range. This approach may have several disadvantages. The use of the compression tank assembly may limit the manoeuvrability of the carrier due to its weight. Once captured, the target will be in free-fall and may become dangerous for people or property below. Finally, agile targets may be difficult to target. U.S. Pat. No. 10,435,153 discloses the use of nets and devices for facilitating capture of unmanned aerial vehicles using an unmanned aerial vehicle (UAV). The net is fired from a container using a propellant or alternative solutions. Once captured, the target will be in freefall and may become a danger for people or property below. US2016376029A1 discloses a small, unmanned air vehicle repulsing apparatus and describes a way to repulse a small, unmanned air vehicle. The described device would fire a capturing bullet that would contain a net adapted to entangle the target and a parachute adapted to reduce the falling speed of the target. As it does not seem to involve a carrier vehicle, the range will be limited. It is unclear how the parachute would be deployed and hitting a moving agile target may be difficult. US2017356726A1 discloses an aerial arresting system for unmanned aerial vehicles which uses a carrier vehicle and describes a way to launch a net using compressed gas chamber. The approach may have several disadvantages. The use of the compressed gas chamber may limit the manoeuvrability of the carrier due to its weight. Once captured, the target will be in free-fall and may become dangerous for people or property below. Finally, agile targets may be difficult to target. US2017355461A also uses a carrier vehicle and employs a capture net that captures other object in the air. The approach may have several disadvantages. The use of a capture net may affect manoeuvrability as it could affect both the centre of gravity and the centre of lift for the carrier vehicle and capture device assembly. Because of the acrobatic manoeuvres required when following an agile target, the capture net could pose a danger for the carrier device. Finally, a large carrier vehicle may be required in order to transport the captured target to a safe location. US2017253348A1 describes a system for arresting and neutralising unmanned vehicles which uses a carrier vehicle. In particular there is described a method of isolation of the unmanned vehicle through the use of a containment shroud that would provide electrical isolation by use of at least one layer of radio frequency absorptive material and, for physical isolation, one layer of structural supportive material. The approach has several potential disadvantages. The use of the containment shroud may affect manoeuvrability as it could affect both the centre of gravity and the centre of lift for the carrier vehicle and the capture device assembly. Because of the acrobatic manoeuvres required when following an agile target, the containment shroud could pose a danger for the carrier vehicle. A large carrier vehicle may be required in order to transport the containment shroud. Electrical isolation may not be effective as some drones can use topological, inertial, or other types of navigation that are not affected by such an electrical isolation-based approach. US2017144756A1 discloses a carrier vehicle, which employs at least one net launcher per carrier and captures the target by firing a net at it. The net is connected to the carrier via cable. The use of the net launcher may limit the manoeuvrability of the carrier due to its weight. Once captured, the target will connect to the carrier vehicle which could affect both the centre of gravity and the centre of lift for the carrier vehicle. Agile targets may be difficult to target. A large carrier vehicle may be required in order to transport the target safely. US2018224262A1 discloses devices and methods for facilitating blast and dispersion mitigation also using a carrier vehicle and describes isolation through the use of a containment vessel. The use of the containment vessel may affect manoeuvrability as it could affect both the centre of gravity and the centre of lift for the carrier vehicle capture device assembly. Because of the acrobatic manoeuvres required when following an agile target, the containment vessel could pose a danger to the carrier device. A large carrier vehicle may be required in order to transport the containment vessel. Similarly, DE102015003323A1 also uses a carrier vehicle and describes isolation through the use of a containment vessel. As noted above the use of the containment vessel may affect manoeuvrability as it could affect both the centre of gravity and the centre of lift for the carrier vehicle and capture device assembly. Because of the acrobatic manoeuvres required when following an agile target, the containment vessel could pose a danger to the carrier device. Additionally, large carrier vehicle may be required in order to transport the containment vessel. U.S. Pat. No. 9,085,362B1 discloses a counter-unmanned aerial vehicle system and method using a carrier vehicle and employs a capture net that captures the target in the air. The use of a capture net may affect manoeuvrability as it could affect both the centre of gravity and the centre of lift for the carrier vehicle and capture device assembly Because of the acrobatic manoeuvres required when following an agile target, the capture net could pose a danger for the carrier device. Finally, a large carrier vehicle may be required in order to transport the captured target to a safe location. In general, other solutions which have a relatively short range can be impractical. Furthermore, other solutions that disrupt the drone's navigation can be dangerous for people or property because the targeted devices can fall from the sky in an uncontrolled fashion and are not guaranteed to work. Safe drone capturing solutions exist, however, they are passive and often involve the use of nets or lines, which, when used in conjunction with carrier vehicles, create drag, can have complicated ways of deployment, and affect the manoeuvrability of the carrier vehicle or even self-damage.

SUMMARY OF THE INVENTION

According to one aspect of the invention there is provided an aerial vehicle capture device for capturing a target aerial vehicle, the capture device comprising a capture mechanism comprising at least one restraining arm, which is deployed on contact of an associated capture trigger with the target aerial vehicle, and in which the at least one restraining arm is deployed from a nominal condition to a capture condition on contact of the associated capture trigger with the target aerial vehicle to restrain the target aerial vehicle.

Preferably, the capture trigger may be associated with the capture device or with a host drone or other host aerial vehicle to which the capture device is connected.

Optionally, the capture trigger may be mechanically actuated by impact with the target aerial vehicle, to deploy the at least one arm to a capture condition.

Alternatively, the capture trigger may include a proximity sensor which causes deployment of the at least one arm to a capture condition when the target is detected.

Optionally, the capture trigger can be actuated remotely by a user to deploy the at least one arm to a target aerial capture condition.

Furthermore, the capture device may be connected or connectable with a host drone or other host aerial vehicle, in which the actuation of the capture trigger may trigger separation of the capture device and the restrained target aerial vehicle from a host drone or other host aerial vehicle to which the capture device is connected or connectable.

Beneficially, a parachute may be deployed after the aerial vehicle to be captured is restrained, to slow the descent of a captured target aerial vehicle and the capture device.

Preferably, the parachute may be located prior to deployment between the capture device and a connected host drone or other host aerial vehicle.

Optionally, the aerial vehicle capture device may comprise 3 to 12, preferably 4 to 8, arms.

Beneficially, the arms may be formed to inhibit release of a captured aerial vehicle.

Furthermore, the at least one arm may be formed with a plurality of backward facing fingers disposed along one or more arms.

Additionally, the capture mechanism may comprise a frame and a slider movable relative to the frame, and a biasing element.

Optionally, the biasing element may include a spring. Furthermore, the spring may be a tension spring. A compression spring may be an option, however.

According to a second aspect of the invention there is provided a combination of an aerial vehicle capture device and an, optionally connected, host drone or other host aerial vehicle.

Preferably, the combination may further comprise a tether for connecting the aerial vehicle capture device to the host drone or other host aerial vehicle.

According to a third aspect of the invention there is provided a method of capturing a target aerial vehicle, the method comprising providing a combination, preferably in accordance to the second aspect, the method comprising bringing the combination into contact with the target aerial vehicle whereby the capture trigger is actuated to deploy the at least one restraining arm from a nominal condition to a captive condition to restrain the target aerial vehicle.

Preferably, the capture device together with the captured target aerial vehicle may detach from the host drone or other host aerial vehicle.

Furthermore, a parachute may be deployed to restrain the descent of the capture device and captured target aerial vehicle.

The described solution is advantageous as it uses retraining arms that restrain the target when contact with the target is achieved between the capture trigger and the target. The capture device of the invention is also advantageous because it leads to separation between the host carrier vehicle (e.g. the host drone) and the now captured target. This has several advantages. First, smaller host carrier vehicles can be used to capture a wide range of targets. Second, the host carrier vehicle does not need to deal with possible awkward centres of gravity or lift following capture which may make it unflyable and a danger to people or property below. Third, the capture device reduces the potential of damage to the host carrier vehicle by diverting the shock of the capture away from the carrier vehicle through separation. Fourth, following a capture operation, another capture device can be attached to the host carrier vehicle making it ready to perform another capture operation straightaway.

BRIEF DESCRIPTION OF THE DRAWINGS

Capture devices and methods in accordance with the invention will now be described, by way of example only, with reference to the accompanying drawings, FIGS. 1 to 26 in which.

A CAPTURE DEVICE

Figure 1:
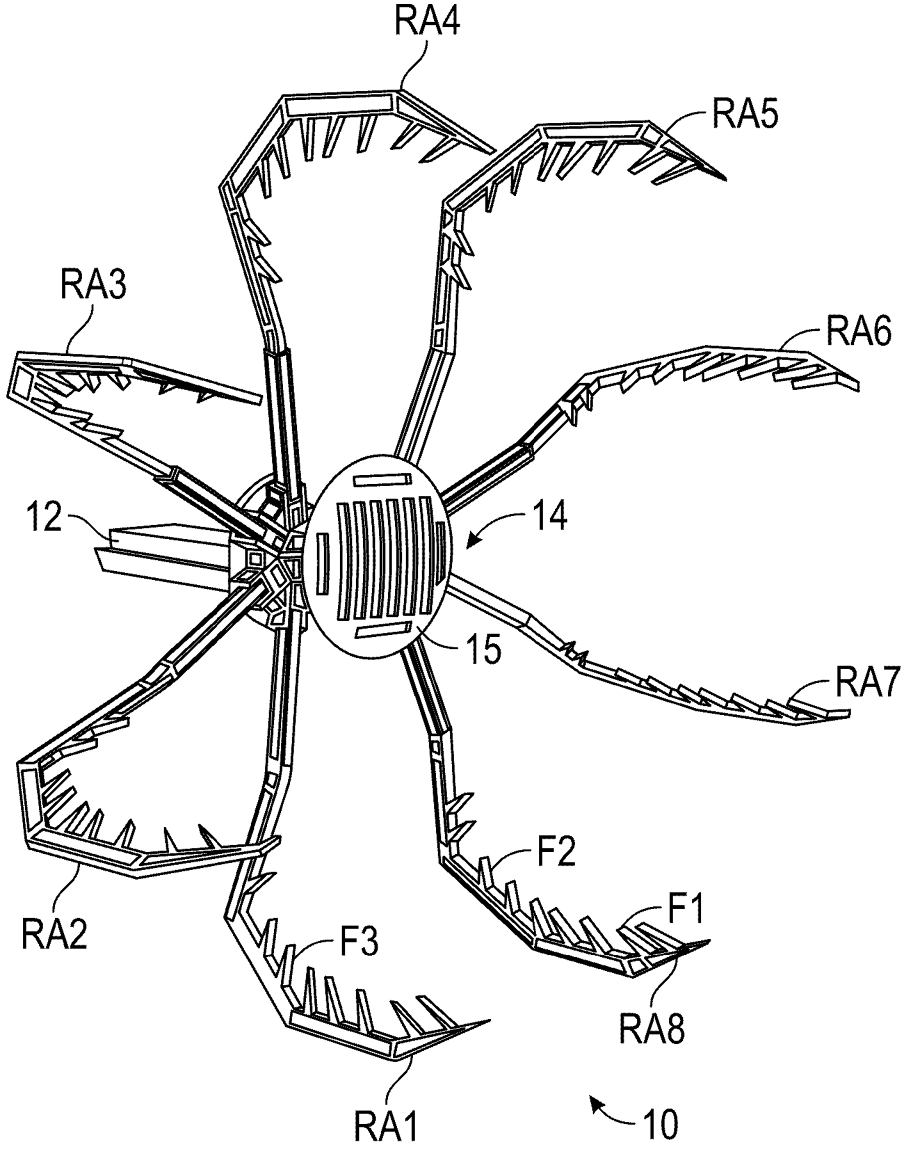
FIG. 1 is a perspective view of a capture device in accordance with the invention in an open or nominal condition.

A capture device 10 in accordance with the invention is shown in FIG. 1, in a nominal or open condition. The capture device comprises a device body 12, a capture trigger 14, and a plurality of restraining arms RA1-8 which are hinged to the body 12. The device body is preferably formed from a plastics material. Alternatively, or additionally the body (and indeed other components of the capture device may be made of aluminium or other light metal or metal alloy. The capture trigger includes a trigger plate 15 and a mechanism (not shown) which controls the deployment of the restraining arms RA1-8 from the nominal condition to a capture or closed condition described below. The restraining arms RA1-8 are similarly typically formed from a plastics material. Each restraining arm RA1-8 is formed with a number of rearwards facing fingers e.g., F1, F2, and F3. The fingers may be rigid or flexible.

Figure 1B:
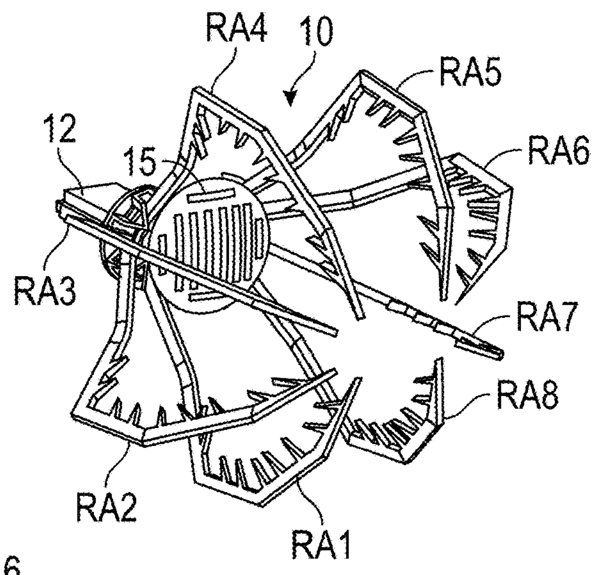
FIG. 1B is a perspective view of the capture device of FIG. 1 in a closed or capture condition.
Figure 1A:
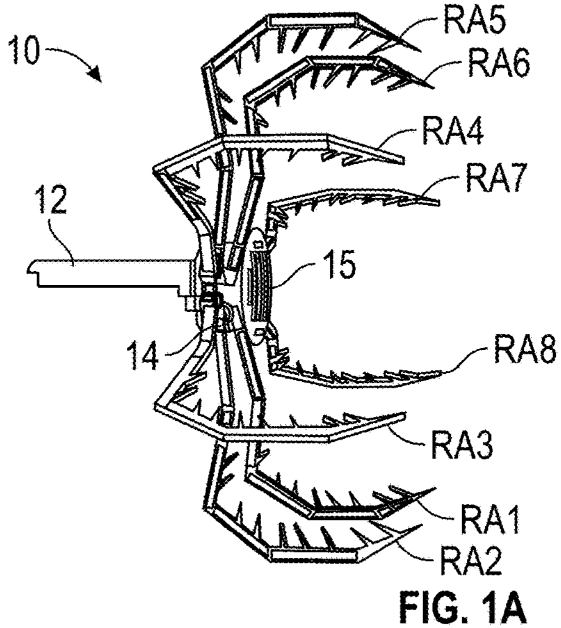
FIG. 1A is a side view of the capture device of FIG. 1 in the open or nominal condition.

The capture or closed condition for the restraining arms RA1-8, in which the arms have pivoted forward to form a cage, is shown in FIG. 1B. FIG. 1B also emphasises the rearward facing nature of the fingers e.g. F1, F2 and F3. A resilient tension ring (not shown) may be provided about restraining arms RA1-8, optionally engaging with connection elements formed by the restraining arms. Furthermore, restraining arms tensioners are attached to each arm which tend to maintain the restraining arms in the open nominal condition shown in FIG. 1.

Figure 1C:
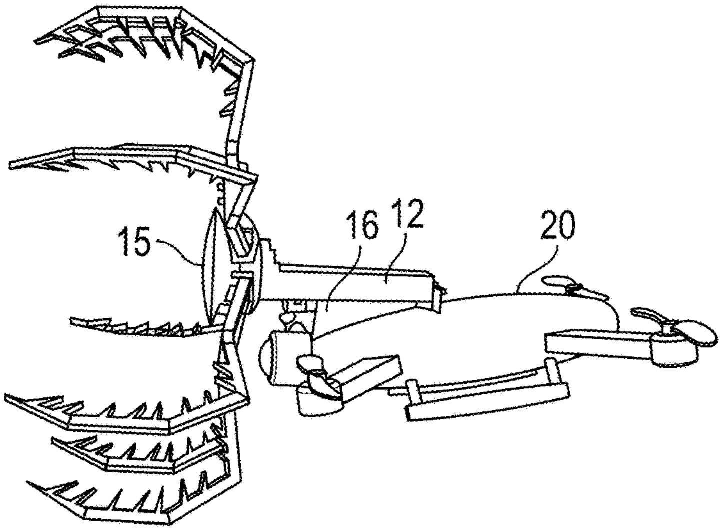
FIG. 1C is a side view of a capture device in accordance with the invention mounted on a host drone.

In use, the capture device is mounted on a host drone 20 or another host aerial vehicle such as a helicopter, aircraft, or missile, by means of a correspondingly shaped support 16. Specifically, body 12 of the device 10 is detachably mounted on a support 16 as shown in FIG. 1C. In practice, the support 16 is mounted on the host drone 20 or other host aerial vehicle to carry the capture device 10. Specifically, FIG. 1C shows a combination comprising the capture device 10 in the nominal condition detachably mounted on a forward side of a host drone 20 via support 16. In this embodiment, the host drone is a quadcopter. A parachute 18 (not shown) is connected to body 12 and stored between the body 12 and the support 16 in a recess defined by the body.

A Method of Capturing a Target Aerial Vehicle

Figure 2:
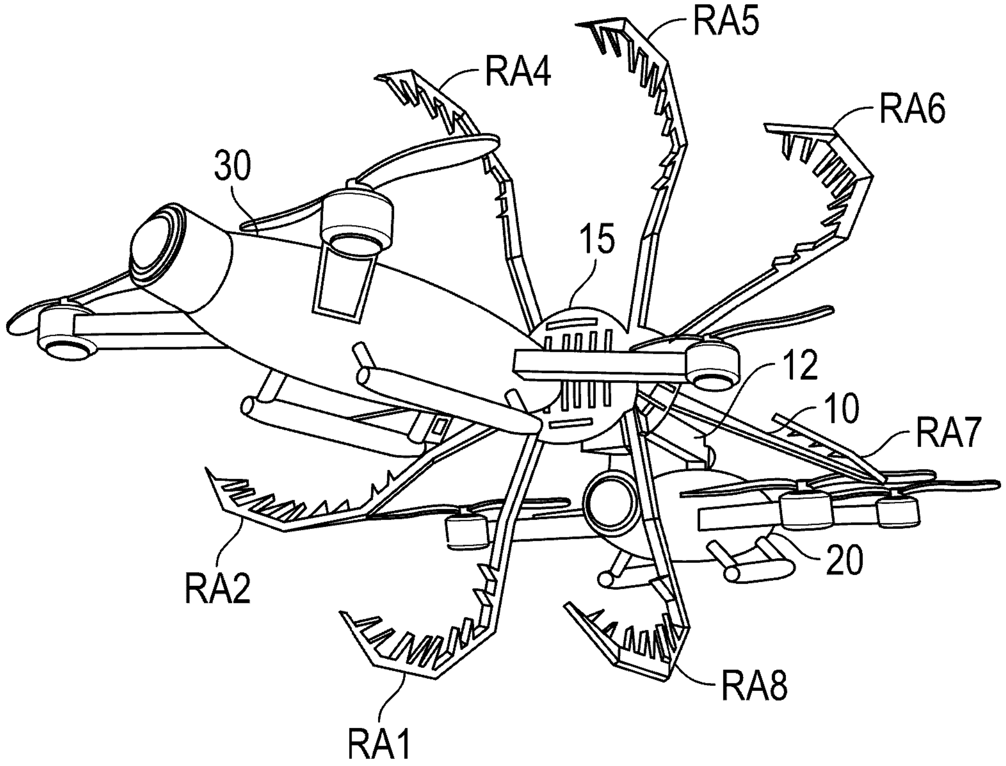
FIG. 2 is a perspective view of a capture device in accordance with the invention in use.
Figure 3:
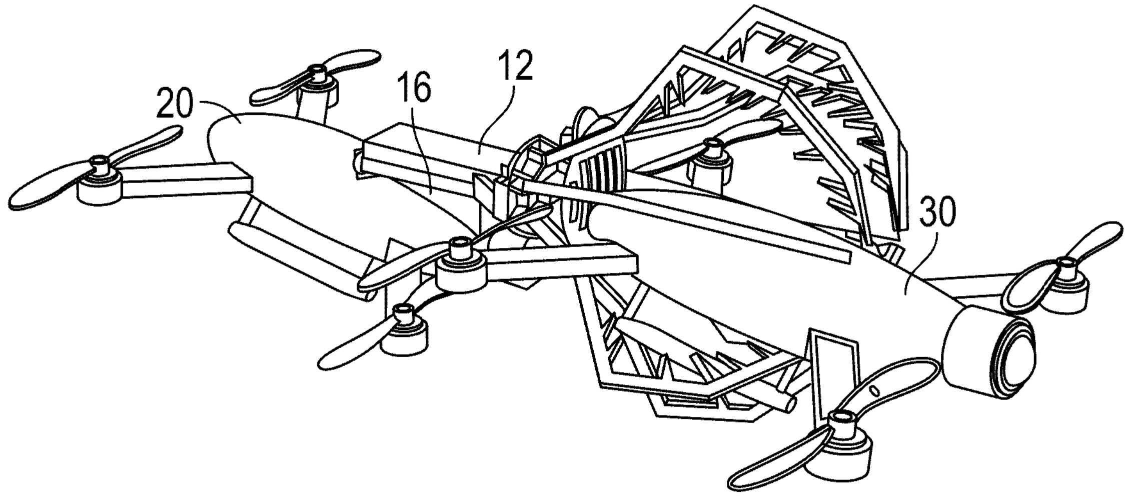
FIG. 3 is a perspective view of the capture device shown in FIG. 2 in a later stage of use.

FIG. 2 shows an initial stage of capturing a target aerial vehicle 30 by the combination of FIG. 1C. The combination has been operated by a user into the vicinity of the target aerial vehicle 30 so that the arms RA1-8 surround the target. The target 30 impacts the trigger plate 15 with sufficient force to actuate the capture trigger 14, causing the body slider to move which disconnects the arm tensioners, triggering the tension ring to urge the restraining arms RA1-8 into the capture or closed condition shown in FIG. 3. In the capture condition, the target 30 is restrained in the cage formed by the restraining arms RA1-8.

Figure 4:
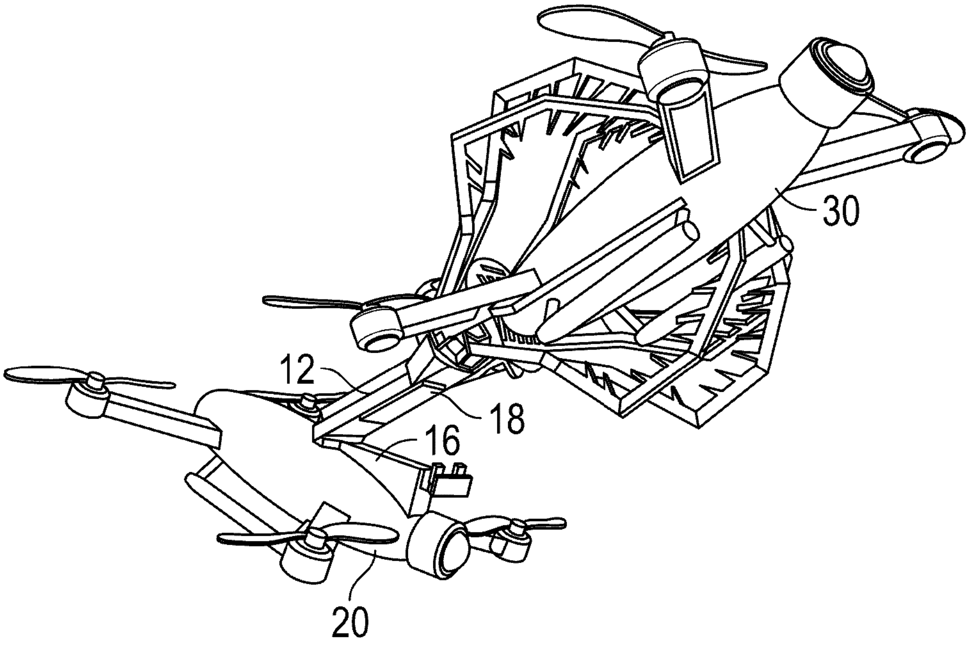
FIG. 4 is a perspective view of capture device shown FIG. 2 in a further stage of use.
Figure 5:
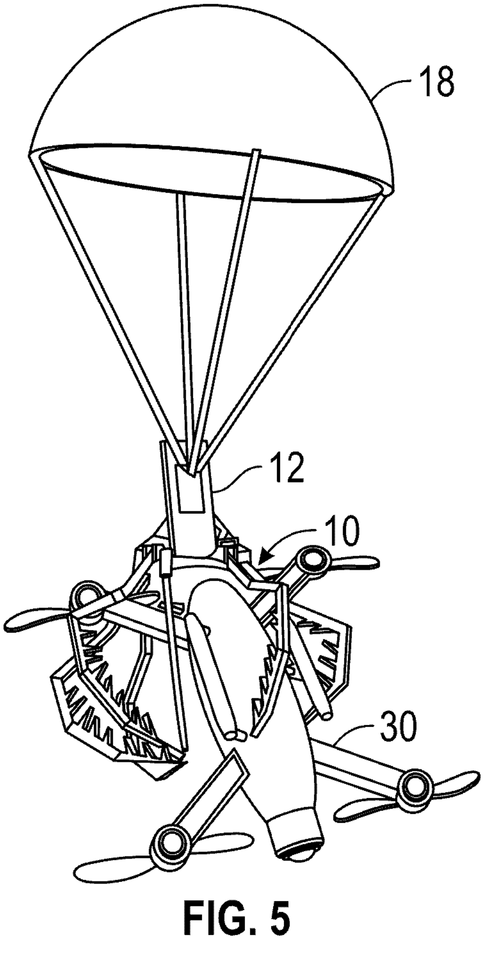
FIG. 5 is a perspective view of the capture shown in FIG. 2 in a yet further stage of use.

The movement of the body slider also initiates separation of the capture device 10 and the captured target 30 from the host drone 20 as shown in FIG. 4. The parachute 18 then deploys as shown in FIG. 5 and slows the descent of the capture device 10 and the captured target 30.

Further Embodiments Including Different Host Drone or Other Aerial Vehicles

Further embodiments are illustrated in the further drawings FIGS. 6 to 26 or described below.

Figure 6:
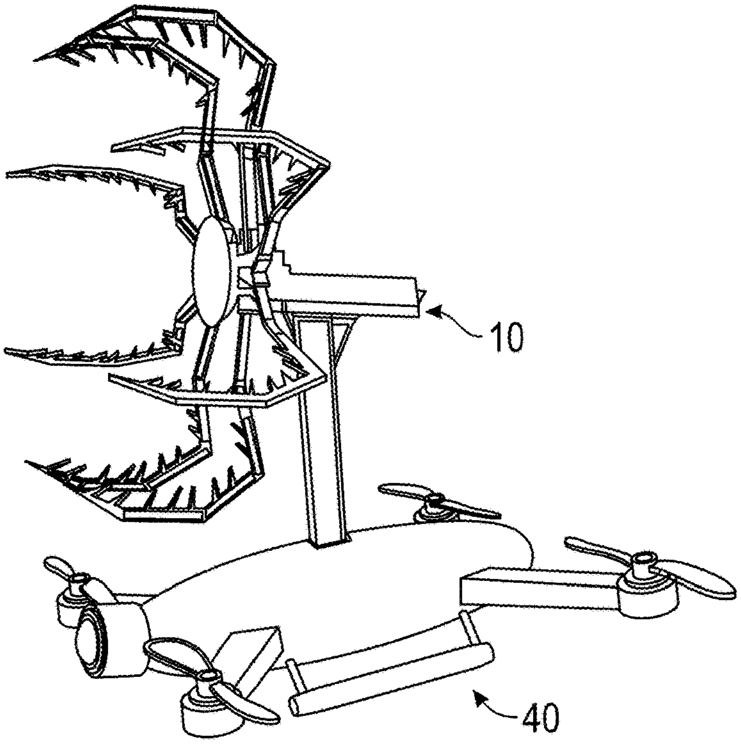
FIGS. 6 to 10 show a variety of mounting positions for capture devices of the invention on a variety of different host aerial vehicles.
Figure 7:
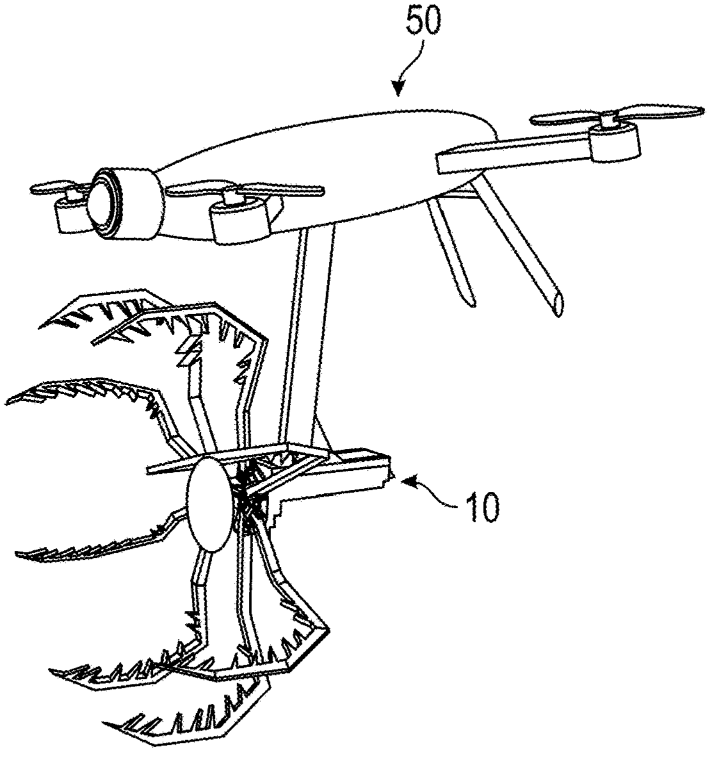
Figure 8:
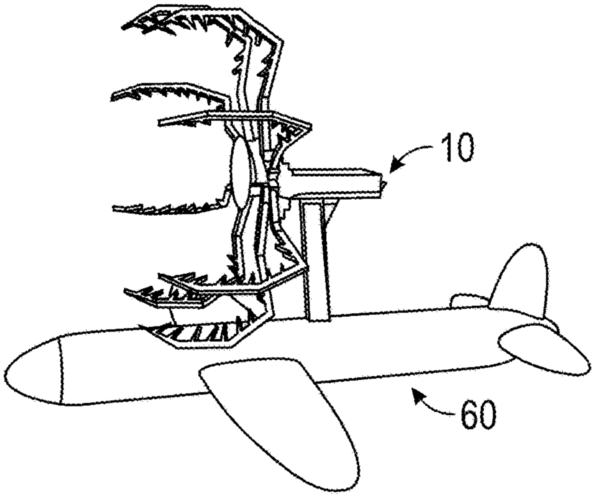
Figure 9:
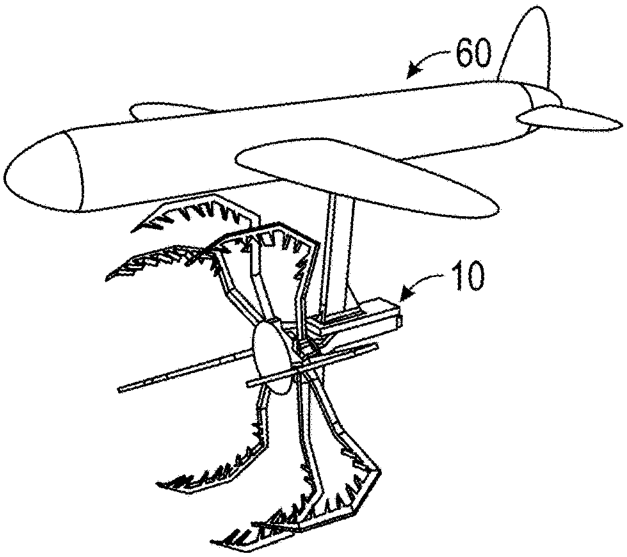
Figure 10:
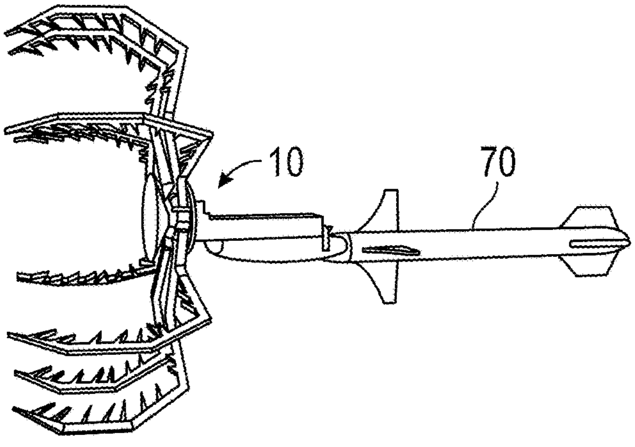

FIG. 6 shows a capture device 10 mounted on an upper surface of a host quadcopter drone 40. FIG. 7 shows a capture device 10 mounted on a lower surface of a host quadcopter drone 50. FIGS. 8 and 9 show a capture device 10 mounted on upper and lower surfaces of a host drone aircraft 60, respectively. FIG. 10 shows a capture device 10 mounted at a forward end of a host aerial vehicle in the form of a missile 70.

Further Embodiments

Figure 11:
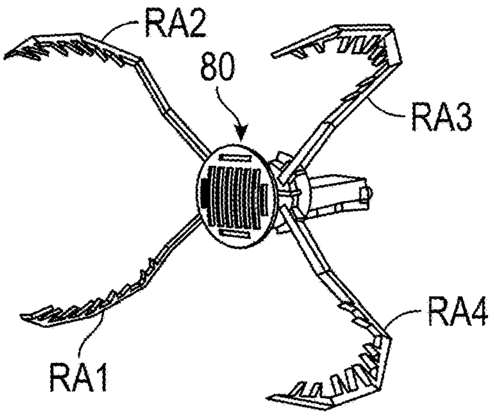
FIGS. 11 to 16 illustrate a series of different restraining arms configurations.
Figure 12:
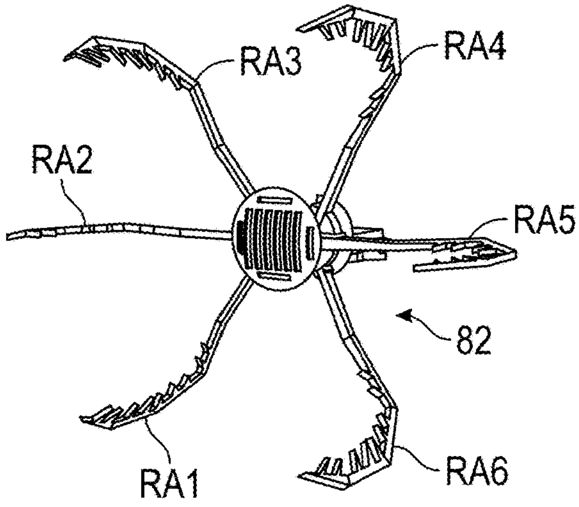
Figure 13:
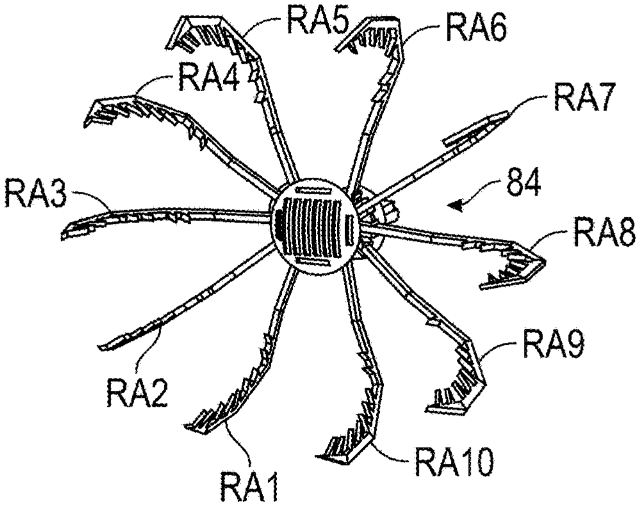
Figure 14:
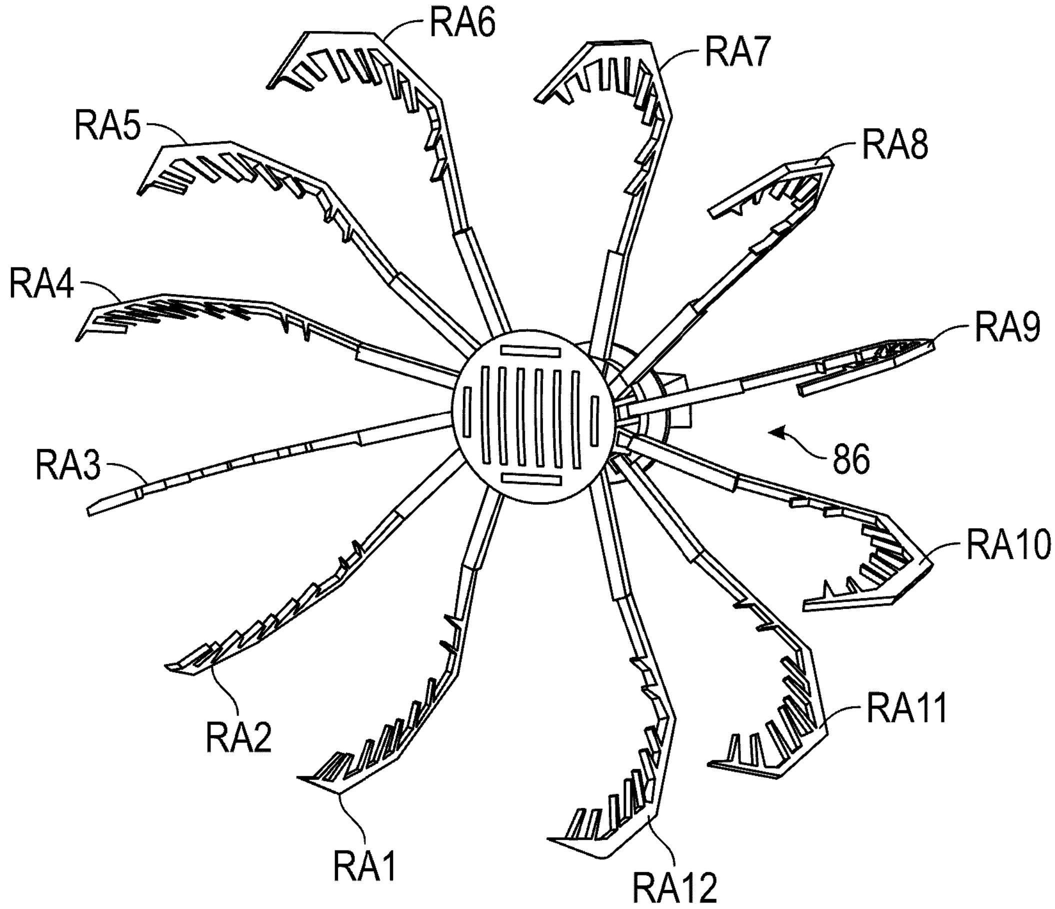
Figure 15:
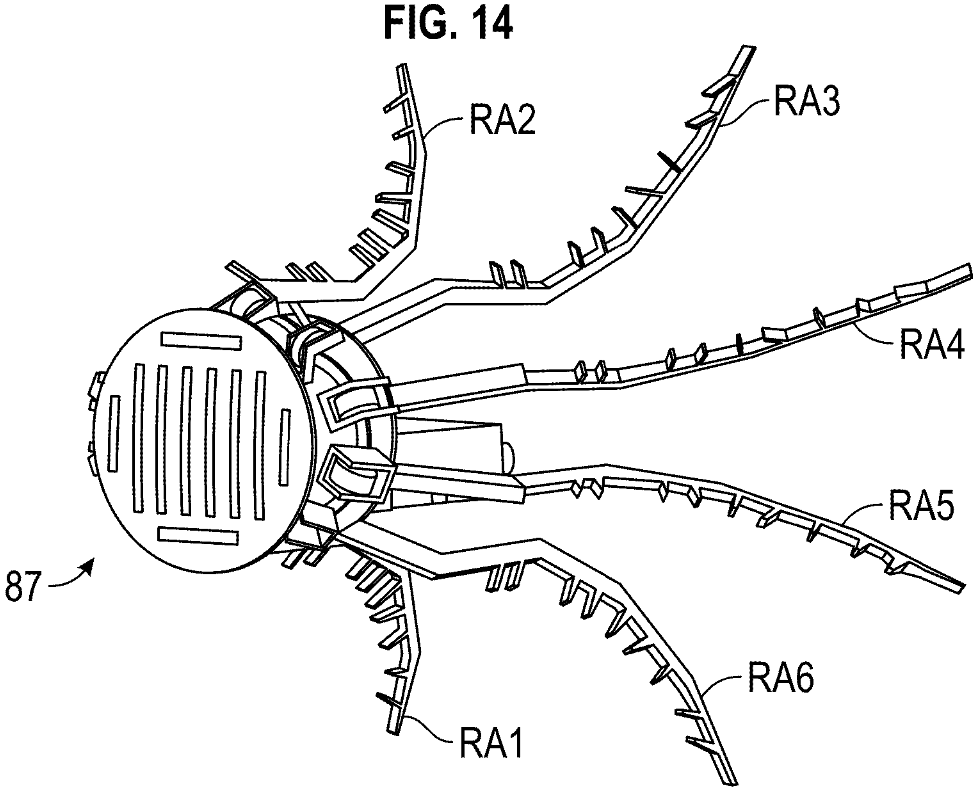

As noted above, capture devices of the invention may have different numbers of restraining arms. FIG. 11 shows a capture device 80 with four restraining arms RA1-4. FIG. 12 shows a capture device 82 with six restraining arms RA1-6. FIG. 13 shows a capture device 84 with ten restraining arms RA1-10. FIG. 14 shows a capture device 86 with twelve restraining arms RA1-12.

In the FIG. 1 embodiment, the restraining arms RA1-8 of capture device 87 are generally normal to the body of the host drone 20. In the embodiment shown in FIG. 15, the restraining arms RA1-6 are swept back in the nominal condition which is depicted.

Figure 16:
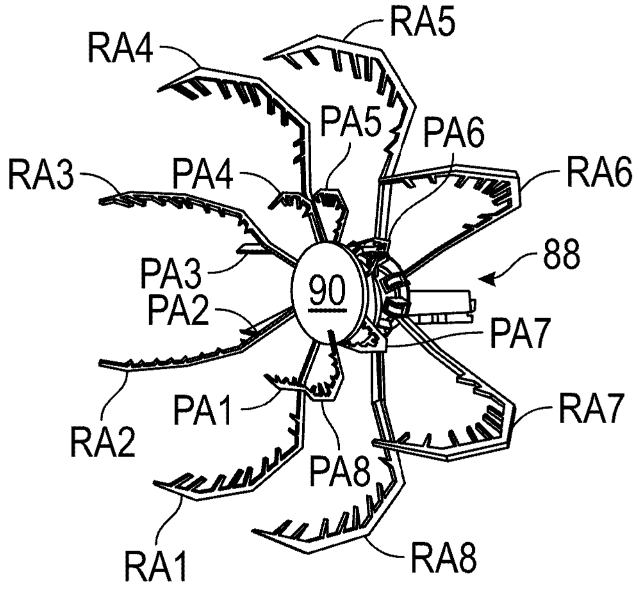
Figure 17:
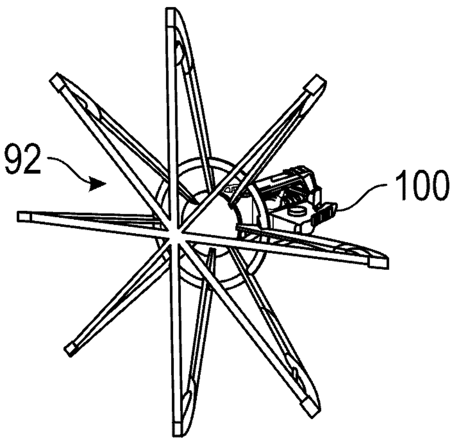
FIGS. 17 and 18 are views of view of an alternative trigger.

FIG. 16 shows a capture device 88 which includes additional passive restraining arms PA1-8 mounted, in this case on the trigger plate 90 within the hinged restraining arms PA1-8 to assist the arms in engaging with and restraining a captured target. The passive restraining arms are fixed rather than hinged.

Body and Trigger Mechanisms

In some embodiments, the body is taller than the body described above. In order to better manage the stress of impacts with target aerial vehicles.

Figure 18:
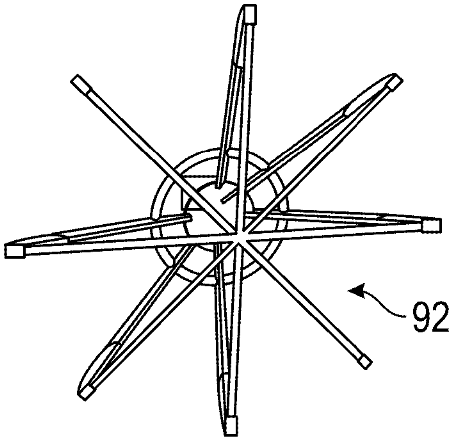

In other embodiments, the essentially planar trigger plate 15 described above may be replaced by a resilient frame-based structure 92 as shown in FIGS. 18 (in isolation) and 17 (attached to body 100 described below) to reduce weight and also dampen the impact with the target. Its design now prevents the restraining arms from being entangled in one another (see FIG. 26). An alternative design of body 100, to the body 12 described above, is shown in FIG. 19. The body 100 comprises restraining arm connectors 102 (opposite connector is obscured), restraining arm tension connectors 104 (opposite connector is obscured), a front spring connector, opposed midpoint parachute connectors 108 (one of which is obscured), and rearward support connectors 110 (again one obscured). In more detail, the body 100 comprises three main elements: a frame 105, a slider 106, and a spring 107. The purpose of the frame 105 is to connect the restraining arms, parachute, rear support, and the slider 106. The slider 106 connects to the capture trigger and slides on the frame 105 via the slider rail. The spring 107 is an example of a biasing element. Any alternative biasing element or biasor could be envisioned. The spring 107, which is arranged between the frame 105 and the slider 106, will push the slider forward. In its forward position, the slider 106 ensures connection to the support via its front support connectors. When the slider 106 is pushed backwards, by either the force of the impact or manually, it disconnects from the support and disconnects the restraining arms tensioners by pushing them off the frame 105, and more preferably, the restraining arm tension connectors 104 of the frame 105, triggering the restraining arms into the closed or capture condition. Finally, the front end of the spring is connected to the frame and the rear end to the slider.

Figure 20:
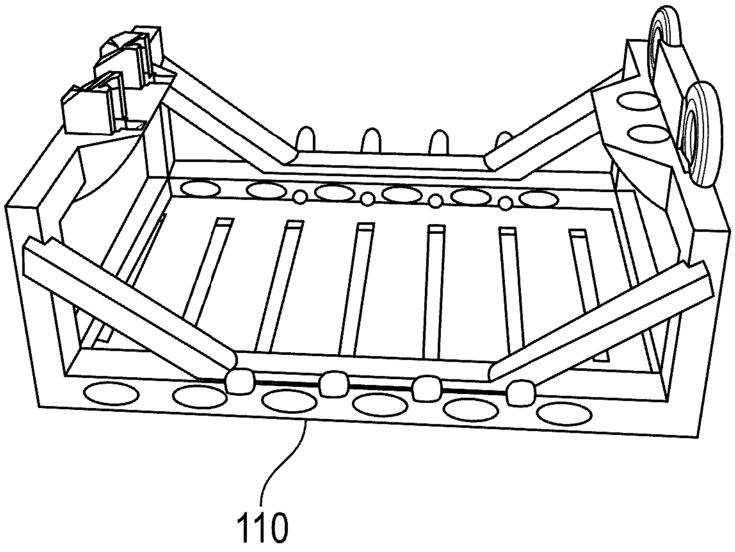
FIG. 20 is a perspective view of an alternative support.
Figure 21:
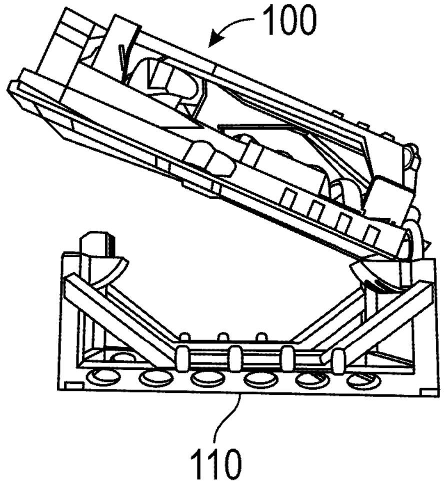
FIG. 21 is a perspective view showing an initial engagement of the body of FIG. 19 with the support of FIG. 20.
Figure 21A:
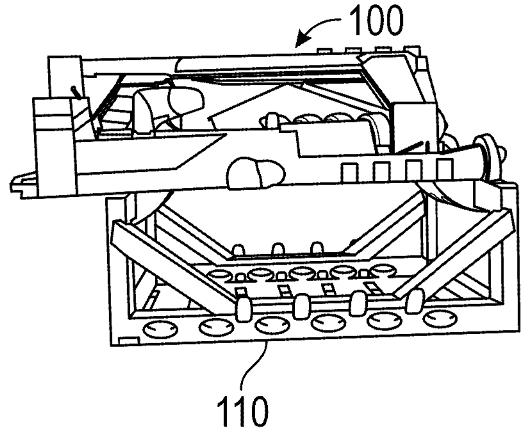
FIG. 21A is a perspective view showing the complete engagement of the body of FIG. 19 with the support of FIG. 20.

In this embodiment, the body 100 is detachably mounted on a support 110 in the form of a frame, which provides a space for the parachute. The support 110 is shown in FIG. 20. In order to connect the body to the support, the body must be connected at its rear end to the support. Then the slider 106 needs to be moved into the backward position and the body pushed down into the support in the position shown in FIG. 21 ending up in the position shown in FIG. 21A. When the slider 106 is moved to the forward position the connection is secured. The support disconnection is triggered in reverse order when the slider 106 is moved into the backward position by the force of the impact with the target aerial vehicle.

Figure 22:
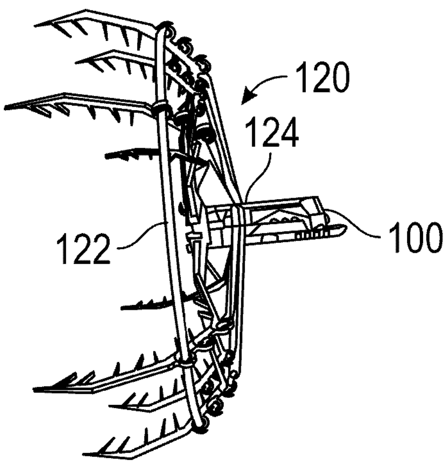
FIG. 22 is a side view of the body of FIG. 19 illustrating the tension ring and restraining arms tensioners.
Figure 23:
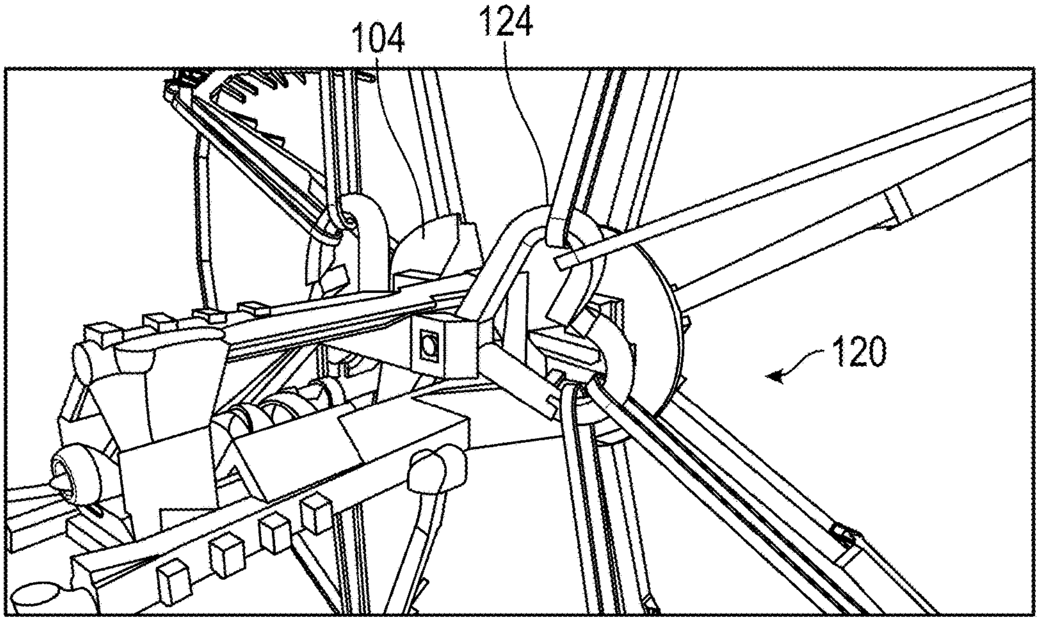
FIG. 23 is a detail view of the body shown in FIG. 22.

A capture device 120 in accordance with the invention including the body 100 described above is shown in more detail in FIGS. 22 to 24. FIG. 22 shows the capture device with its restraining arms in an open condition and shows in particular the tension ring 122 and the restraining arm tensioners 124 that hold the restraining arms open. FIG. 23 shows in more detail the restraining arm tensioners 124 and the restraining arm tension connectors 104 to which they are attached in the open condition and from which they detach as the device goes into the transition device.

Figure 24:
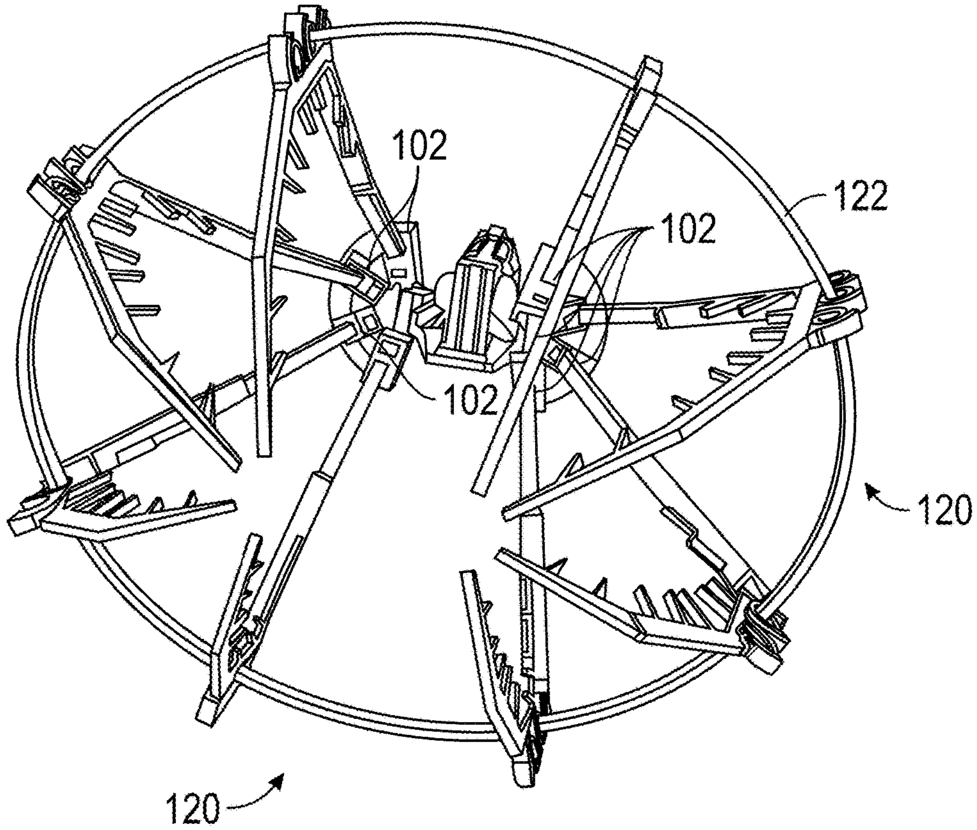
FIG. 24 is a perspective view of an alternative arrangement of restraining arms showing the engagement with the tension ring in a closed or capture condition.

FIG. 24 is simply an alternative view of the capture device 120, without the capture trigger, showing the tension ring 122 and the restraining arm connectors 102.

Figure 25:
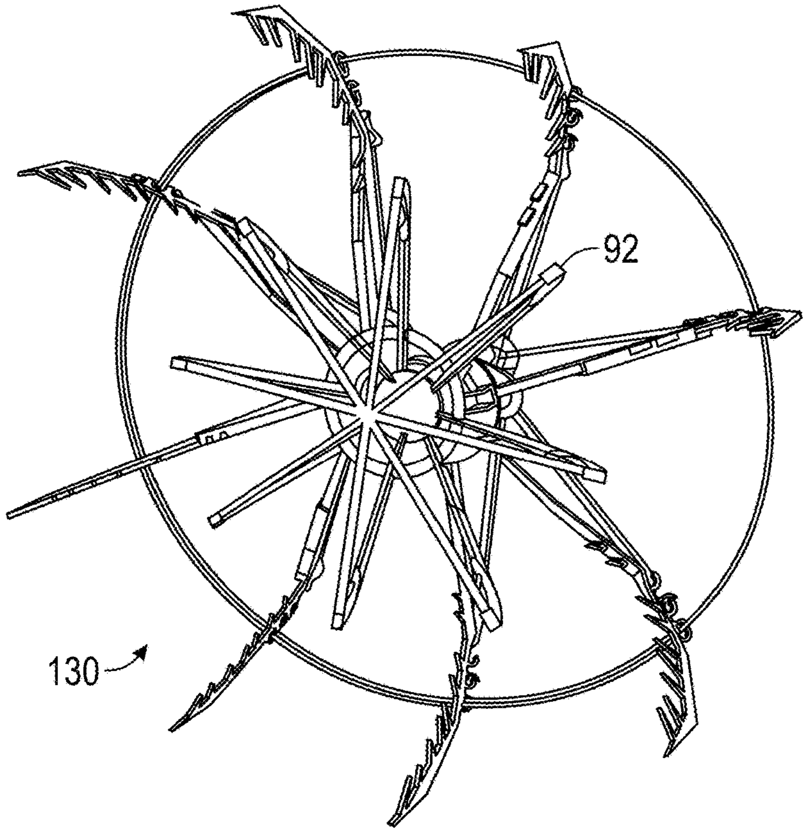
FIG. 25 is a perspective view of an alternative arrangement of restraining arms showing the engagement with the tension ring in an open condition.
Figure 26:
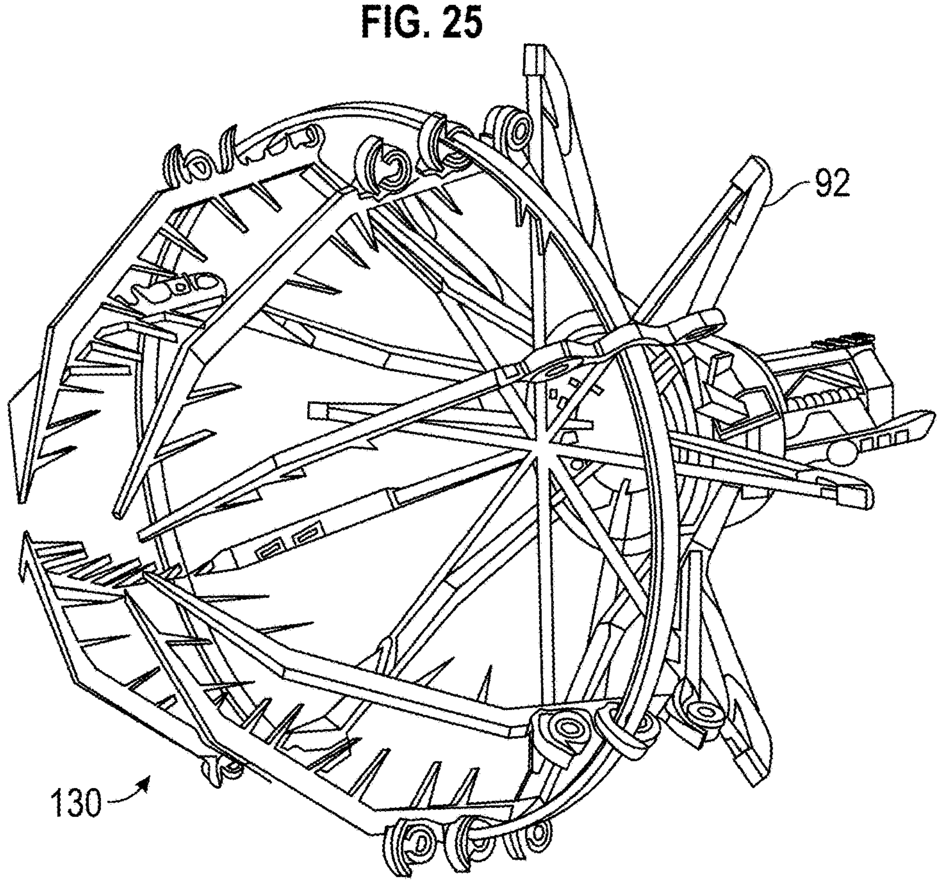
FIG. 26 is a perspective view of a capture device in accordance with the invention with an alternative arrangement of restraining arms and the trigger of FIG. 18 in a closed or capture condition.

FIGS. 25 and 26 show a further capture device 130 in accordance with the invention incorporating the frame like trigger 92 of FIG. 18 in an open and closed or capture condition respectively. FIG. 26 shows how the elements of the trigger 92 interleave with the restraining arms in the closed or capture condition avoiding entanglement as mentioned above.

Figure 27:
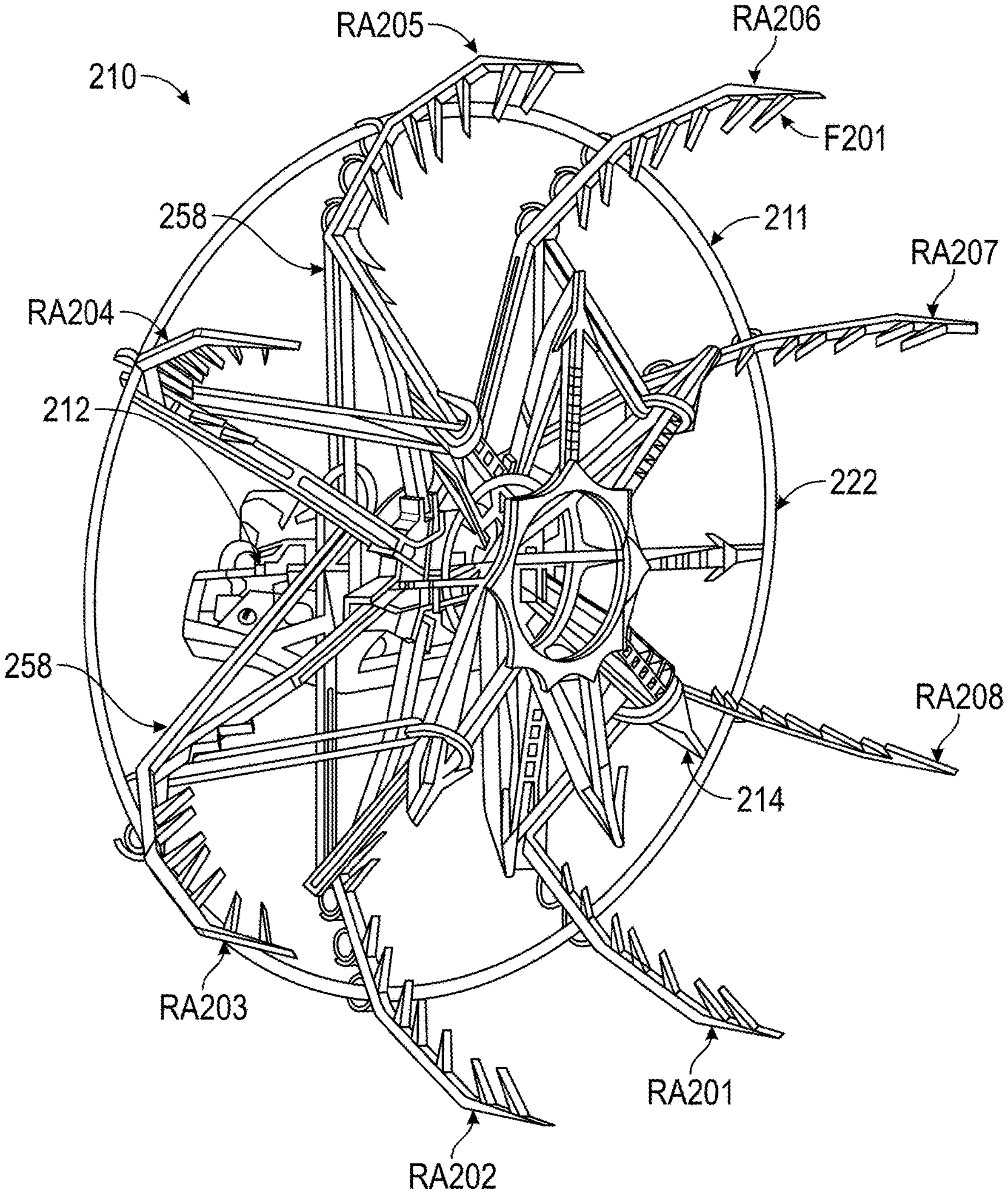
FIG. 27 illustrates a perspective view of a further embodiment of a capture device in accordance with the first aspect of the invention.

Referring now to FIG. 27, there is provided a further embodiment of a capture device 210. The capture device 210 is similar to the first embodiment of the capture device 10. The capture device 210 is mountable or connectable to a host aerial vehicle 220, preferably via a support 216 of the host aerial vehicle 220. Optionally, the host aerial vehicle 220 and the capture device 210 may collectively form a capture system 226, also known as a combination. The reference numerals of features of the further embodiment of the capture device 210 start at 202.

The further embodiment of the capture device 210 has same or similar device body 212, a capture trigger 214, at least one and preferably a plurality of restraining arms RA201-208, at least one restraining arm tensioner 224 and a tension ring 222, although any of the above may be omitted and/or a plurality of any of the above may be provided. The device body 212, capture trigger 214, plurality of restraining arms RA201-208, the at least one restraining arm tensioner 224 and the tension ring 222 may be jointly referred to as a capture mechanism 211.

The capture device 210 further comprises a flexible elongate element, referred to as a tether 228 for clarity, and a parachute 218.

Figure 19:
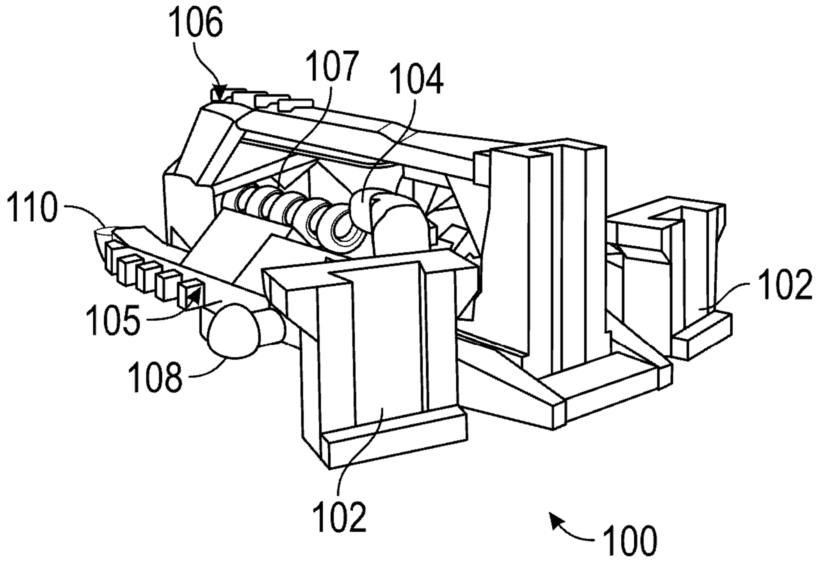
FIG. 19 is a perspective view from above of an alternative body.

Similarly to the embodiment of the device body 100 shown in FIG. 19, the device body 212 of the further embodiment includes a biasing element 219, a slider 206 and a frame 205, but any of the above may be omitted and/or a plurality of the above may be provided.

Figure 28:
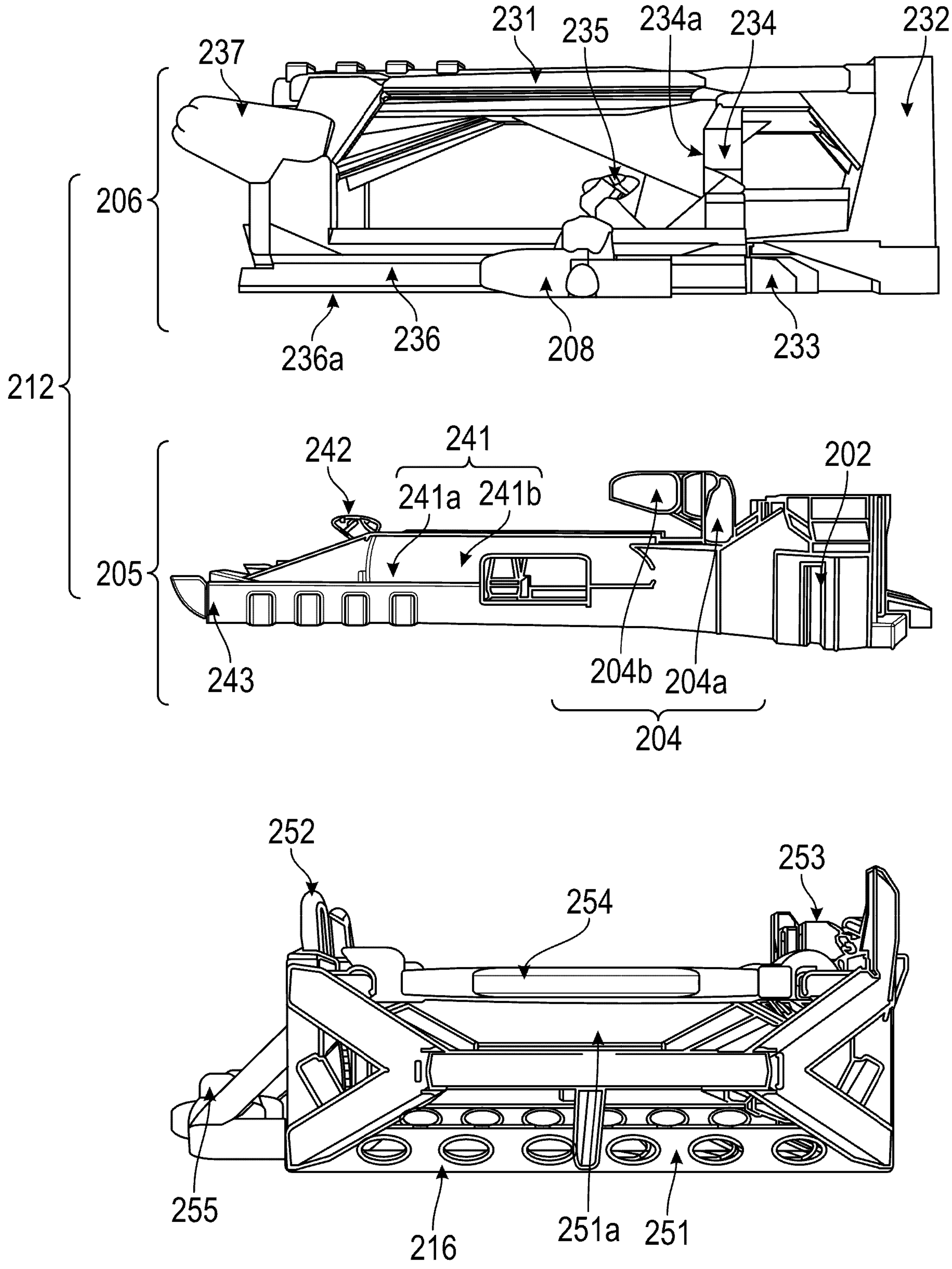
FIG. 28 shows an exploded perspective side view of a device body of the capture device of FIG. 27 and a support of a host aerial vehicle, the device body being in-use engageable with the support of the host aerial vehicle, with a parachute, a tether, and a biasing element of the capture device being omitted for clarity.
Figure 29:
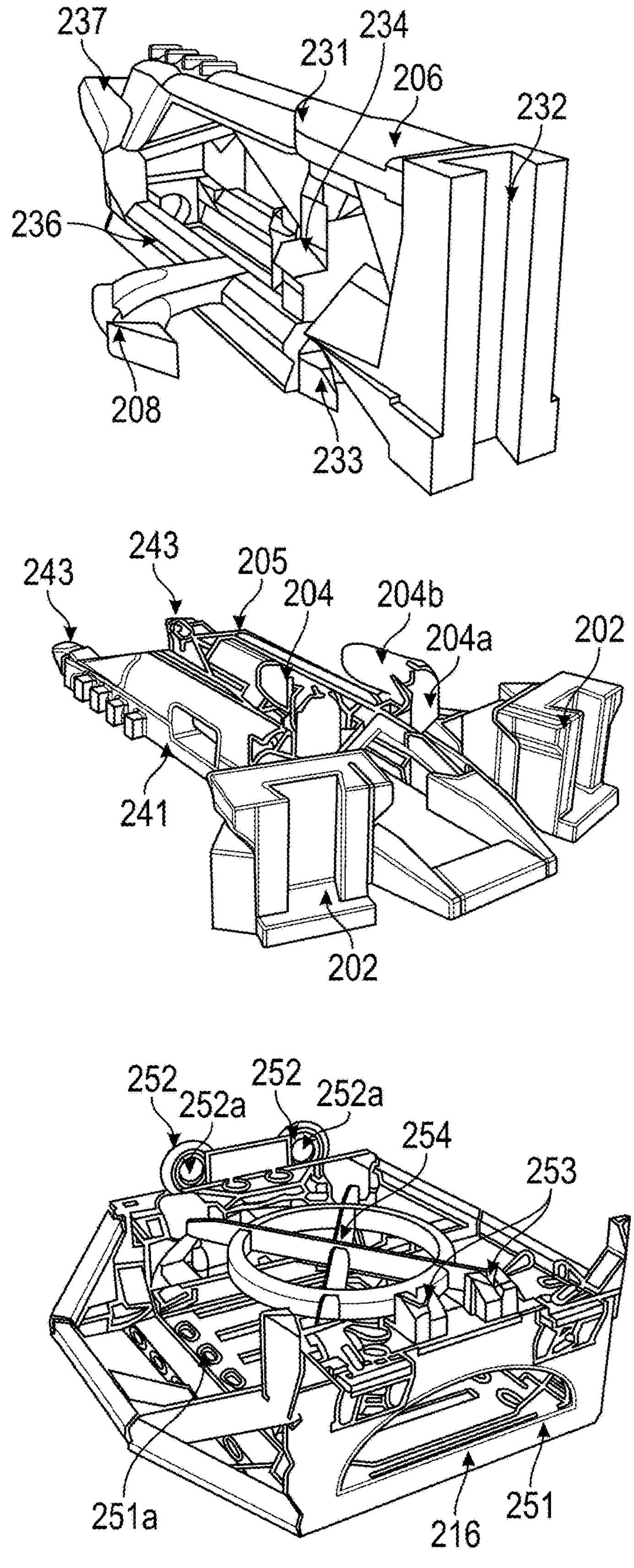
FIG. 29 shows an exploded perspective top view of the device body and the support of FIG. 28, with a parachute, a tether, and a biasing element omitted for clarity.
Figure 30:
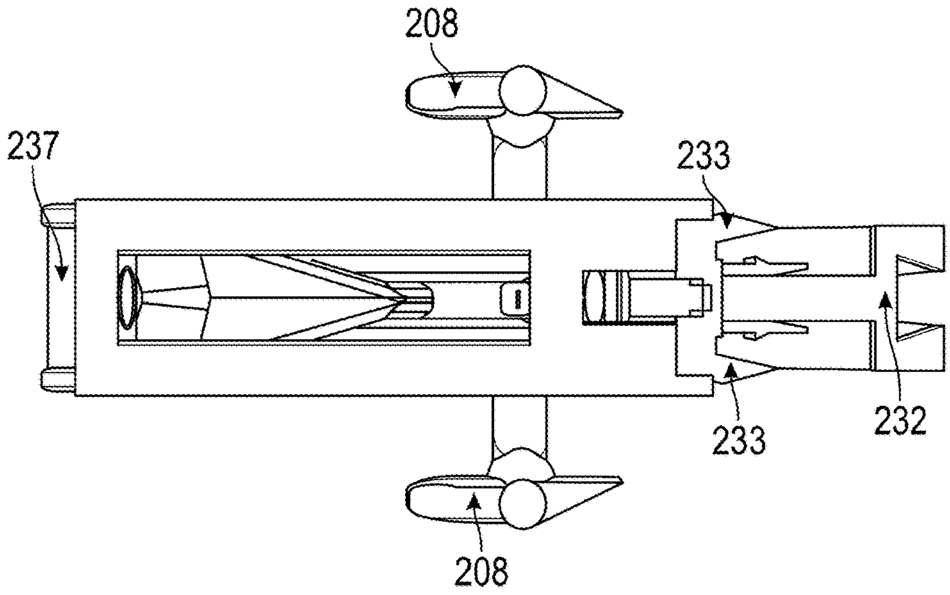
FIG. 30 illustrates a bottom perspective view of a slider of the device body of FIG. 28, with the parachute, tether, and biasing element being omitted for clarity.
Figure 31:
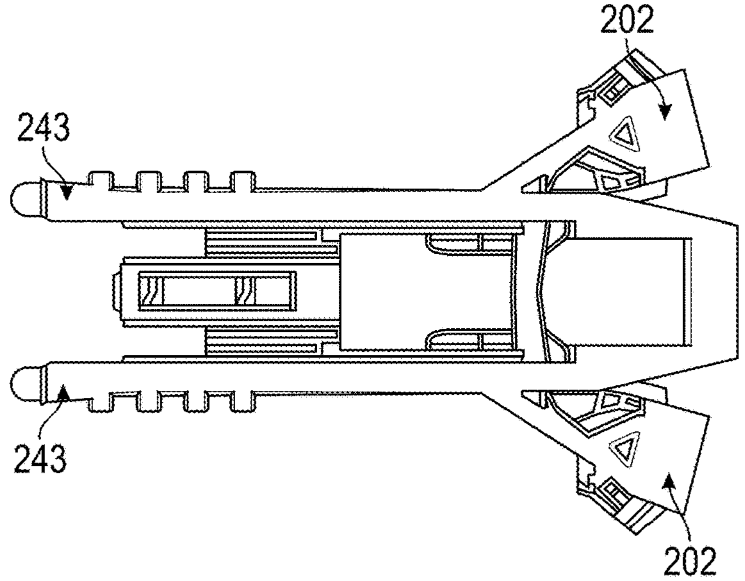
FIG. 31 is a bottom perspective view of a frame of the device body of FIG. 28.
Figure 32:
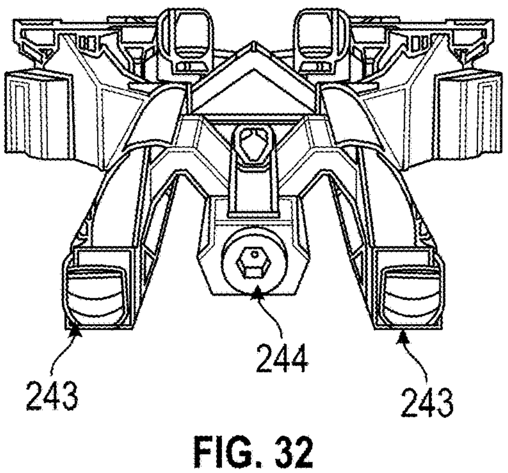
FIG. 32 is a rear view of the frame of FIG. 31.
Figure 33:
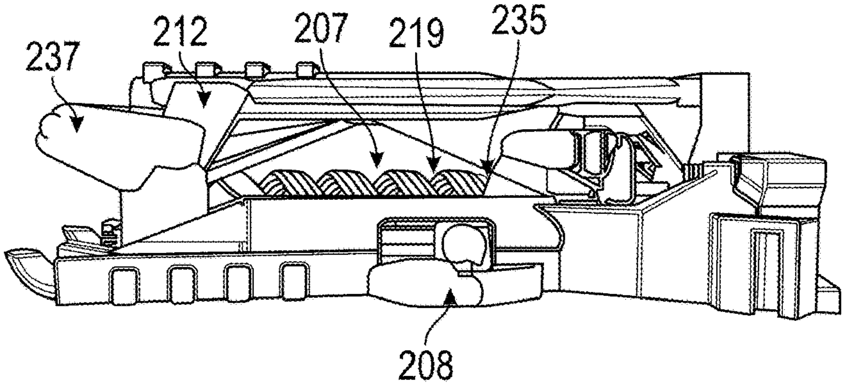
FIG. 33 illustrates an assembled perspective side view of the device body of FIG. 27, with the parachute and tether omitted for clarity but including a biasing element.
Figure 34:
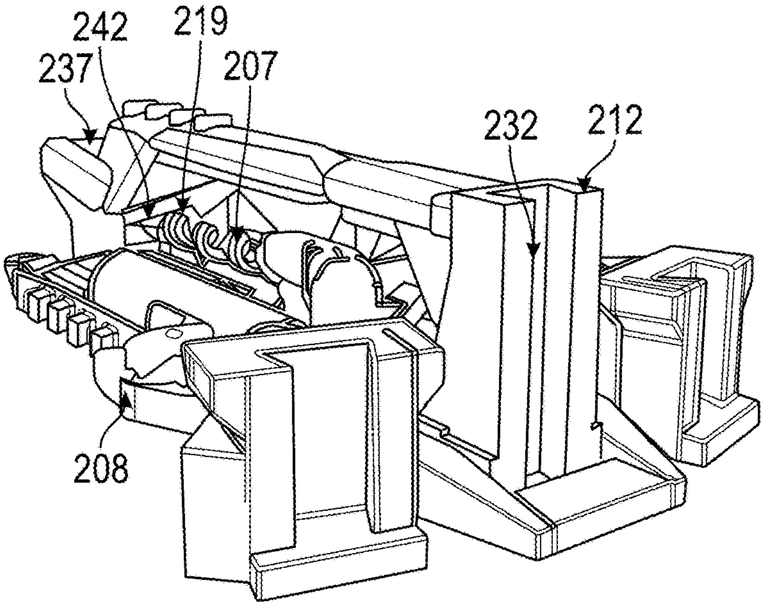
FIG. 34 shows an assembled perspective top view of the device body of FIG. 33.
Figure 35:
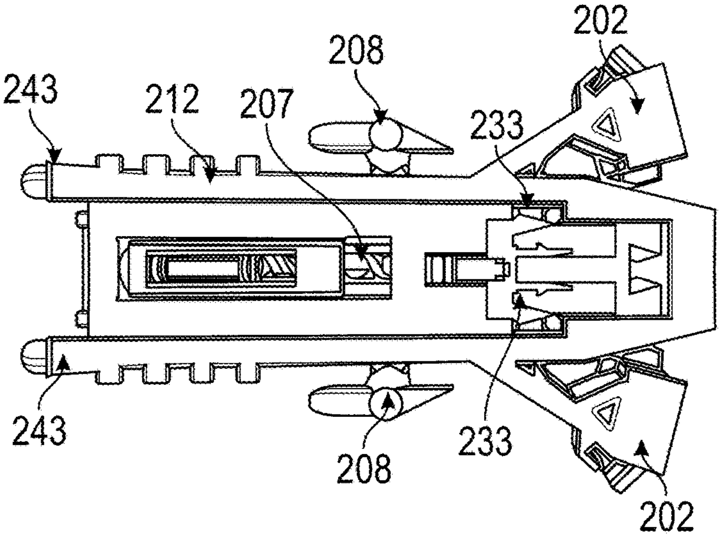
FIG. 35 illustrates an assembled perspective bottom view of the device body of FIG. 33.

FIG. 28 shows an exploded perspective side view of the slider 206 and the frame 205 of the device body 212, as well as the support 216 of the host aerial vehicle 220. FIG. 29 shows the same parts in an exploded perspective top view. FIGS. 30 and 31 are bottom views of the slider 206 and the frame 205, respectively. FIG. 32 is a rear view of the frame 205. FIGS. 33, 34 and 35 illustrate perspective side, perspective top and perspective bottom views of the device body 212 in a compact or assembled condition, with the support 216 of the host aerial vehicle 220 omitted for clarity.

The biasing element or biasor 219 preferably includes a spring 207. In previous embodiments, the spring was preferably a compression spring. Whilst a compression spring could easily be envisioned here, the spring in the present embodiment is more preferably a tension spring. A tension spring may beneficially increase the speed of activation of the capture device 210 in the present arrangement. The spring 207 is not visible in FIGS. 28 to 32 for clarity but is shown in FIGS. 33 to 35.

The slider 206 is connected or connectable to the capture trigger 214. The slider 206 is movable, preferably slidably, relative to the frame 205. The slider 206 includes a slider body 231, a capture trigger connector 232, a front support connector 233, an arm tensioner disconnector 234, a front biasing-element connector 235, a slider rail 236, a parachute connector 208 and an arrest wire connector 237, but any of the above may be omitted and/or a plurality of any of the above may be provided.

The slider body 231 provides a support for all other components of the slider 206. The slider body 231 may define a space.

The capture trigger connector 232 in-use is connected or connectable to the capture trigger 214. Although illustrated as a groove in the shown embodiments, the capture trigger connector 232 may alternatively have any shape which permits the capture trigger 214 to engage or connect with, on, in, around, or through the capture trigger connector 232.

The front support connector 233, also referred to as first support connector or proximal support connector 233, in-use enables the device body 212, and more preferably, the slider 206 thereof, to connect to the frame 205 and/or, preferably, to the support 216. The first support connector 233 is preferably positioned proximal to the capture trigger connector 232, which is here at or adjacent the front end of the device body 212. There are preferably two front support connectors 233.

The arm tensioner disconnector 234 in-use disconnects the arm tensioner or tensioners 224 from the device body 212 and more preferably, the frame 205 thereof when the slider 206 is moved relative to the frame 205. The arm tensioner disconnector 234 includes an abutment surface 234*a*. In the shown embodiment, there are preferably two arm tensioner disconnectors 234, but any number may be envisioned, including none, one or at least three.

The first or front biasing-element connector 235 in-use enables a first end of the biasing element 219 to be connected to the slider 206. As the front biasing element 219 is preferably a spring 207, the front biasing-element connector 235 may also be referred to as a first spring connector or front spring connector.

The slider rail 236 in-use engages with the frame 205 so as to enable the slider 206 to be moveable relative thereto, preferably by sliding. Preferably, the slider rail 236 has a frame-engagement surface 236*a* which in-use faces, engages, abuts against or sits on the frame 205 or part thereof. The frame-engagement surface 236*a* is preferably planar.

The parachute connector 208 in-use enables a parachute 218 to be connected or connectable to the slider 206. As shown, there are two parachute connectors 208 but any number including none, one, or at least three may be provided, for example to provide a redundancy of attachment points. The, each or at least one parachute connector 208 is preferably associated with the slider 206, unlike previous embodiments. This may limit the slide range. Additionally or alternatively, this may keep the, each or at least one restraining arm tensioner 224 connected to the parachute connectors 208.

An arrest wire connector 237, also referred to as a tether connector or tether connection element, in-use enables the tether 228 to be connected or connectable to the device body 212, and more preferably to the slider 206. The arrest wire connector 237 is preferably provided in the form of a bar but any alternative to a bar, such as a hook, ring or any other suitable alternative may be envisioned. Optionally, the arrest wire connector 237 may comprise a spool, drum or bobbin. The arrest wire connector 237 is preferably provided at or adjacent the end of the slider 206 opposite to the capture trigger connector 232, but anywhere along the slider could be envisioned. This spatial separation may prevent or inhibit the tether from interfering with, preventing or inhibiting the movement of the restraining arms. Thus, in the shown embodiment, the arrest wire connector 237 is located at or adjacent the rear of the slider 206.

The frame 205, also referred to as body frame for clarity, in-use together with the slider 206, controls the deployment of the restraining arms RA201 from the nominal condition to the capture condition. The frame 205 has a frame body 241, a capture arm connector 202, a capture arm tensioner connector 204, a rear biasing-element connector 242, a rear support connector 243, and a biasing-element tensioning portion 244, but any of the above may be omitted and/or a plurality of any of the above may be provided.

The frame body 241 in-use provides a support for all other components of the frame 205. The frame body 241 further comprises a slider-engagement surface 241*a* and a central portion 241*b*.

The slider-engagement surface 241*a* faces, engages, abuts against or provides a support to the slider 206, and more preferably the frame-engagement surface 236*a* thereof. The central portion 241*b* in-use prevents or inhibits lateral of movement of the slider 206 relative to the frame 205 when the slider 206 and the frame 205 are assembled together.

The capture arm connector 202, also referred to as a restraining arm connector or connection, in-use enables one or more restraining arms to be connected or connectable to the or at least one said capture arm connector 202. Two capture arm connectors 202 are shown in FIGS. 28, 29, 31, 34 and 35, but any number may be envisioned.

The capture arm tensioner connector 204, also known as a restraining arm tensioner connector, enables one or more restraining arm tensioners to be connected or connectable to the device body 212 and more preferably to the frame 205 thereof. There are preferably two capture arm tensioner connectors 204 shown. In the shown embodiments, the or each capture arm tensioner connector 204 includes a protrusion 204*a* and a cantilevered portion 204*b*, most clearly shown in FIG. 28. The cantilevered portion 204*b* preferably extends from the protrusion 204*a*. The cantilevered portion 204*b* also preferably extends away from the restraining arms RA201-208 and/or capture trigger 214. Thus, in this case, the cantilevered portion 204*b* extends at least in part towards the rear.

The rear biasing-element connector 242, also referred to as second biasing-element connector in-use enables the second end of the biasing element 219 to be connected to the device body 212, and preferably to the frame 205 thereof. As the biasing element 219 is preferably a spring 207, the rear biasing-element connector 242 may also be referred to as a second spring connector.

The rear support connector 243, also referred to as second support connector, in-use engages or connects with the frame 205. As shown, there are two rear support connectors 243 but again, any number may be envisioned. The, each or at least one rear support connector 243 is provided in the form of a protrusion or projection. Optionally, the terminal end of the protrusion may be curved and/or tapered. Curvature and/or tapering may facilitate engagement and/or disengagement with the support 216.

The biasing-element tensioning portion 244 in-use enables the tension of the biasing element 219 to be adjusted. As the biasing element 219 is a spring here, the biasing-element tensioning portion 244 may be referred to as a spring tensioning portion 244. The tension adjustment is preferably achieved by altering the spacing between the front biasing-element connector 235 and the rear biasing-element connector 242, and more preferably by moving the position of rear support connector 243 relative to the front support connector 233 or vice-versa. The biasing-element tensioning portion 244 is shown in FIG. 32. Preferably, the biasing-element tensioning portion 244 is positioned between the rear support connectors 243 but any suitable location elsewhere in the device body 212 may be selected instead. Furthermore, the biasing-element tensioning portion 244 includes here a spring tension screw but any additional or alternative feature may be envisioned, such as a toggle, sliding element or portion, a ratchet system, by ways of example. The support 216 in-use enables the capture device 210 to be mounted to the host aerial vehicle 220. Similarly to previous embodiments, the support 216 preferably has a support frame 251, a rear frame connector 252 and a front frame connector 253, but any of the above may be omitted and/or a plurality of any of the above may be provided. Additionally, the support 216 may further comprise a partition member 254 and a tether-anchor 255.

The support frame 251 forms a cavity or recess 251*a* within which the parachute 218 may be stored until deployed. The support frame 251 is preferably wider than previous embodiments, to allow for a larger parachute 218.

The rear frame connector 252, also referred to as a second frame connector or distal frame connector, in-use engages or connects with the rear support connector 243. Preferably, there are as many rear frame connectors 252 as there are rear support connectors 243, but different numbers of rear frame connectors on the support relative to the number of rear support connectors may be envisioned. As most clearly shown in FIG. 29, there are preferably a plurality of, here two, rear frame connectors 252. Each rear frame connector 252 has an aperture or recess 252*a* within which the rear support connector 243 is insertable or inserted. More preferably, each or at least one rear frame connector 252 includes a ring or ring element, and the said recess or aperture 252*a*, which is defined by the ring or ring element.

Figure 36:
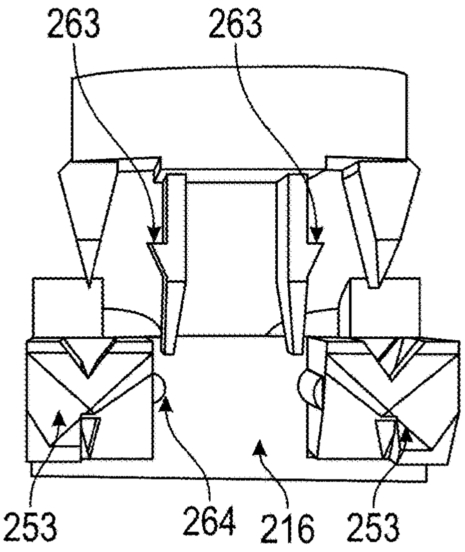
FIG. 36 shows a close-up perspective top view of the front support connectors of the device body and the front frame connectors of the support in FIG. 28, in-use, prior to engagement with each other during assembly of the capture device, with part of the slider and part of the support omitted for clarity.
Figure 37:
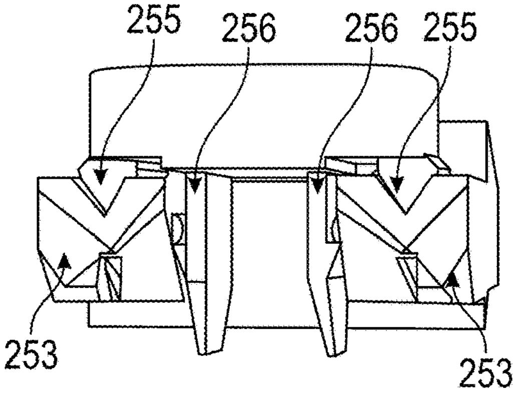
FIG. 37 is a close-up perspective top view of the front support connectors of the device body and the front frame connectors of the support in FIG. 36, in-use, after engagement with each other during assembly of the capture device.

The front frame connector 253, also referred to as a first frame connector or proximal frame connector, in-use engages or connects with the front support connector 233. Preferably, there are as many front frame connectors 253 as there are front support connectors 233, but again, the numbers of front frame connectors may differ from that of the front support connectors. As most clearly shown in FIG. 29, there are preferably a plurality of, here two, front frame connectors 253. FIGS. 36 and 37 shows close-ups of the front frame connectors 253 and the front support connectors 233 before and after engagement of the front frame connectors 253 with the front support connectors 233.

Each or at least one said front support connector 233 preferably includes two portions, referred to as a positioning portion 255 and an immobilising portion 256 for clarity, although either could be omitted and/or a plurality of either may be provided.

The positioning portion 255 in-use helps to position the front support connector 233 relative to the front frame connector 253 More preferably, the positioning portion 255 in-use enables the front support connector 233 to be at least in part received on, around, through, against or, preferably in the front frame connector 253. Each front frame connector 253 preferably has a corresponding cavity to receive the positioning portion 255. Here, each the positioning portion 255 is or is generally a wedge-shaped portion, optionally chamfered, truncated or rounded, but non-wedge shaped may be an option. A tapered shape may facilitate insertion into the complementarily shaped cavity of the front frame connector 253.

The immobilising portion 256 of the front support connector 233 and the front frame connector 253 have complementary engagement elements 263,264. The engagement elements or portions 263,264 when engaged together, prevent or inhibit accidental disengagement of the front support connector 233 from the front frame connector 253. In the preferred embodiment, one of the engagement elements 263 is provided in the form of a tooth and the other engagement element 264 in the form of a, preferably convex, protrusion. Any suitable alternative engagement elements may be considered.

If provided, the partition member 254, also referred to as a parachute separator or a partition, in-use separates or partitions to the body of the parachute 218 from the device body 212 of the capture device 210. This separation reduces or eliminates the risk of the parachute 218 preventing or inhibiting separation of the device body 212 from the support 216. The partition member 254 is, preferably hingeably, connected to the support 216. The hinge enables the partition member 254 to remain attached to support 216 after moving out of the way of the parachute 218 into an access condition and reduce the risk of the partition member 254 becoming lost.

The tether-anchor 255 in-use enables the tether 228 to be connected or connectable to the support 216. The tether-anchor 255 is shown most clearly in FIG. 28. The tether-anchor 255 is preferably provided at or adjacent the rear of the support 216 but away therefrom may be an option. Either or both of the tether-anchor 255 and the arrest wire connector 237 may comprise a, preferably rotatable, spool, drum or bobbin. The spool enables storage of the tether 228 when the tether 228 is not in-use. Rotatability enables the spool to rapidly dispense the tether 228 when required.

The tether 228, also referred to as a flexible elongate element or arrest wire, in-use enables the capture device 210 to be tethered to the host aerial vehicle 220. The tether 228 may be, by way of examples only, a wire, string, elastic band, chain, or cable. The tether 228 may be stored by being connected to the arrest wire connector 237, and more preferably wound therearound.

The parachute 218 in-use slows the rate of descent of the capture device 210 and any captured target aerial vehicle 230, when deployed.

Figure 38:
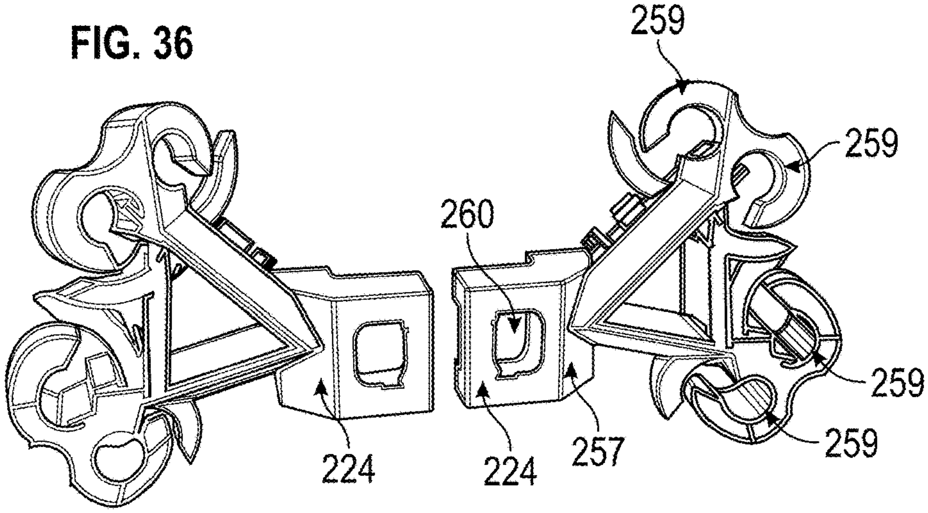
FIG. 38 illustrates a close-up perspective view of restraining arm tensioners of the capture device of FIG. 27, with elongate elements omitted for clarity.

Referring now to FIG. 38, there are shown parts of two restraining arm tensioners 224, although the capture device 210 may have any number of restraining arm tensioners 224, including none, one, or at least three. There may optionally be as many restraining arm tensioners 224 as there are restraining arms RA201-208, or any multiple or fraction thereof. The restraining arm tensioners 224 may also referred to as capture arm tensioners. Relative to previous embodiments, the restraining arm tensioners 224 are smaller. Each, or at least one restraining arm tensioners 224 has a tensioner body 257 and at least one elongate element 258, shown in FIG. 27. In FIG. 38, the elongate elements 258 are omitted for clarity.

The tensioner body 257 is in-use connected or connectable to the device body 212, and more preferably to the frame 205 thereof. Most preferably, the tensioner body 257 is connected or connectable to the capture arm tensioner connector 204. The or each tensioner body 257 defines a bore 260. The bore 260 may be a blind bore or, as shown, a through-bore. The tensioner body 257 has at least one tensioner anchor 259. Unlike previous embodiments, the or each tensioner anchor 259 preferably only engages one elongate element 258. Furthermore, each tensioner body 257 preferably has a greater number of tensioner anchors 259 than previous embodiments. The at least one elongate element 258 in-use prevents or inhibits the restraining arms RA201-208 from moving into or toward the closed condition. The at least one elongate element 258 connects to the tensioner body 257 and more preferably to the or a said tensioner anchor 259 thereof. The at least one elongate element 258 also connects to, preferably one, restraining arm RA201-208. The, each or at least one elongate element 258 is preferably flexible but non-flexible, such as rigid, may be an option. String, rope, an elastic band are all examples of a suitable elongate element 258.

Figure 39:
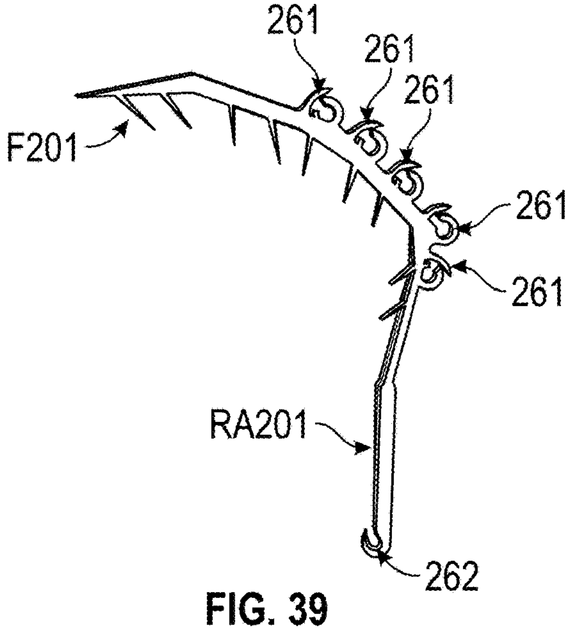
FIG. 39 shows a close-up side view of a restraining arm of the capture device of FIG. 27.

FIG. 39 illustrates an example of a restraining arm RA201. The restraining arm RA201 includes a restraining connector 261, a base connector 262 and a finger F201, but any of the above may be omitted and/or a plurality of any of the above may be envisioned. The, each or at least one restraining arm RA201-208 is preferably reinforced, relative to the restraining arms RA1-8 of previous embodiments. Preferably, each restraining arm RA201-208 is movable in a different plane relative to an immediately adjacent restraining arm RA201-208.

Each restraining connector 261 is in the form of an open ring structure but any suitable alternative could be envisioned. There are preferably five restraining connectors 261 in the shown embodiment, which is two more than in previous embodiments.

The base connector 262 enables connection to the capture trigger 214 and/or, preferably, to the device body 212. More preferably, the base connector 262 is connected or connectable to the or a said capture arm connector 202. The base connector 262 enables the restraining arm RA201 to be movable, here pivotably or hingeably, relative to the device body 212. The base connector 262 is illustrated as being a hook or hook element.

Figure 40:
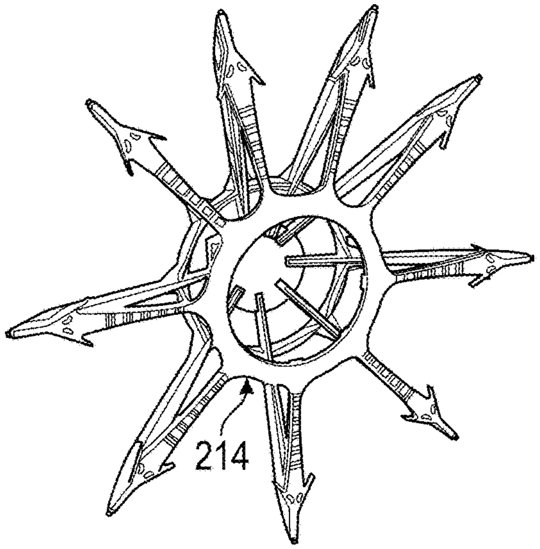
FIG. 40 is a close-up perspective front view of a capture trigger of the capture device of FIG. 27.

FIG. 40 illustrates a capture trigger 214. The capture trigger 214 is preferably stronger relative to the capture trigger of previous embodiments. Optionally, the capture trigger 214 has at least one, and preferably a plurality of connection points to which one or more capture arm tensioners 224 may optionally be connected.

The uses of the further embodiment are similar or the same as previous embodiments.

The capture device 210 may be provided in an assembled condition. Alternatively, the capture device 210 may be provided in a partly or fully disassembled condition, such as in a kit. The user may need to assemble the capture system 226, and/or at least the capture device 210 thereof prior to use.

To assemble the capture system 226 and/or capture device 210, any or all of the following steps may need to be carried out, not necessarily in the following order.

The device body 212 of the capture device 210 is assembled by engaging the slider 206 and the frame 205 together. More preferably, the central portion 241*b* of the frame 205 may be moved into the space of the slider body 231. The frame-engagement surface 236*a* of the slider 206 is made to engage with, face or abut against the slider-engagement surface 241*a* of the frame 205.

The biasing element 219, which is embodied here by a spring 207, is connected to the rear biasing-element connector 242 and the front biasing-element connector 235. The tension of the biasing element 219 may be adjusted, if required, via the biasing-element tensioning portion 244. If provided, the body of the parachute 218 is inserted into the cavity 251*a* of the support frame 251. The parachute 218 is also connected to the, each or at least one said parachute connector 208.

Before, during or after assembly of the frame 205 and the slider 206, the or each rear frame connector 252 of the support 216 are preferably engaged with the or each rear support connector 243 of the frame 205. In the shown embodiment, this involves inserting the or each rear support connector 243 shaped as a curved protrusion into the aperture 252*a* of the or each corresponding rear frame connector 252.

Referring back to FIG. 36, the front support connector 233 and the front frame connector 253 are aligned relative to each other. The front support connector 233 is then moved so that the positioning portion 255 is inserted into the cavity of the front frame connector 253. The tooth moves beyond the protrusion, so that the engagement elements 263,264 are engaged as shown in FIG. 37. The tooth prevents or inhibits accidental disengagement of the engagement elements 263, 264 such that the immobilising portion 256 immobilises, at least temporarily, the device body 212 relative to the support 216.

As the biasing element 219 is preferably a tension spring 207, moving the front support connector 233 so as to engage the front frame connector 253 causes the biasing element 219, here a tension spring 207, to be stretched. The biasing element 219, and more preferably spring 207, is therefore under tension. The tension spring 207 exerts a restorative, biasing rearward force. This rearward force is opposed by the engagement of the front support connector 233 and the front frame connector 253, and more preferably by the engagement of the tooth forward of the protrusion.

If not already provided, the tether 228 is connected to the arrest wire connector 237 on the device body 212 and to the tether-anchor 255 on the support 216.

The capture trigger 214 is connected to the capture trigger connector 232.

The, all or at least a plurality of restraining arms RA201-208 are connected to the restraining arm connectors 202, here by engaging the base connector 262 thereof to the or each restraining arm connector 202.

The tension ring 222 is connected to or engaged with the restraining arms RA201-208.

The at least one elongate element 258 is engaged with at least one of the restraining connectors 261 on the, each or a said restraining arm RA201. The at least one elongate element 258 is also engaged to at least one tensioner anchor 259 of the tensioner body 257.

The tensioner body 257 is connected to the device body 212, and more preferably to the or each capture arm tensioner connector 204. In the shown embodiment, this involves moving the or each capture arm tensioner connector 204 so that the cantilevered portion 204*b* of the or each capture arm tensioner connector 204 is received within the or each bore 260 of the or each capture arm tensioner connector 204. The or each abutment surface 234*a* is positioned so that, when moved by an impact on the capture trigger 214, the or each abutment surface 234*a* abuts against and moves the or each tensioner body 257 along the cantilevered portion 204*b* of the or each capture arm tensioner connector 204.

The restraining arms RA201-208 are moved so that the capture device 210 is in the open condition by the user and/or the tensioning caused by the tensioner 224. When the tensioner body 257 is connected to the device body 212, this causes the tensioner 224 to exert a tensioning force on the restraining arms RA201-208. Preferably, the force applied by the tensioner 224 is greater than the force applied by the tension ring 222 on the restraining arms RA201-208. Thus, the capture device 210 is maintained in the open condition as long as the tensioner body 257 is connected to the device body 212.

The capture system 226 is in an assembled condition, with the capture device 210 mounted to the support 216 of the host aerial vehicle 220, and in the open or nominal condition.

To disassemble the capture system 226, the opposite steps are carried out, not necessarily in the reverse order.

Figure 41:
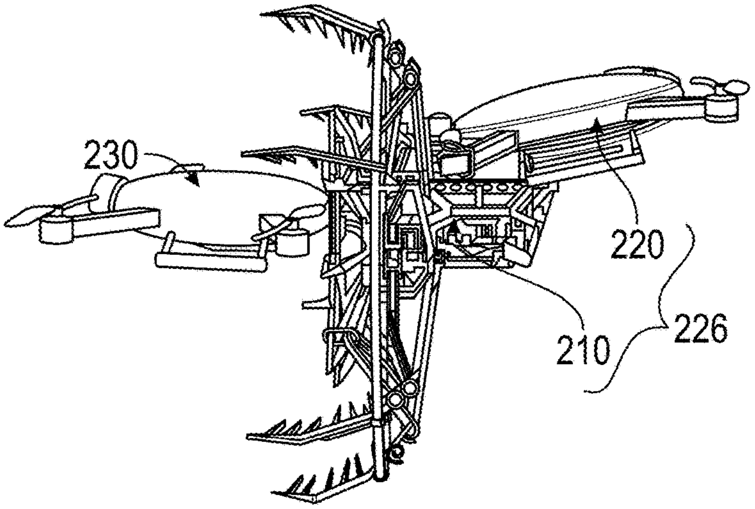
FIG. 41 illustrates a side view of a capture device of FIG. 27 in an assembled condition and mounted to a host aerial vehicle, in-use, prior to the capture device engaging with a target aerial vehicle.

Once in the assembled condition, the user may use the capture system 226 to intercept and capture a target such as a target aerial vehicle 230. FIG. 41 illustrates the capture system 226 prior to intercepting a target aerial vehicle 230.

Upon the target aerial vehicle 230 impacting the capture trigger 214, the trigger mechanism is activated. More preferably, an impact to the capture trigger 214 causes the slider 206 to move rearward relative to the frame 205. Rearward movement of the slider 206 relative to the frame 205 is aided by the tensioned biasing element 219, here a tension spring. If the biasing element 219 were a compression spring instead, the slider 206 would need to move against the compression spring.

If the impact is of sufficient magnitude, this causes multiple effects, leading to the capture device 210 transitioning to the closed or capture condition and, preferably, disconnecting the capture device 210 from the host aerial vehicle 220.

The first effect is that the front support connectors 233 become disengaged from the front frame connectors 253. More preferably, the or each tooth moves rearward past the convex protrusion and/or the positioning portion 255 exits the cavity of the front frame connector 253. The or each rear support connectors 243 exits from the or each rear frame connector 252 The device body 212 detaches from the support 216.

The second effect is that the abutment surface 234*a* of the or each arm tensioner disconnector 234 moves rearward with the slider 206. The or each abutment surface 234*a* abuts against and moves the or each tensioner body 257 along the rearward-oriented cantilevered portion 204*b* of the or each capture arm tensioner connector 204. If the tensioner body 257 is moved sufficiently far, the tensioner body 257 moves off the free end of the cantilevered portion 204*b* such that the cantilevered portion 204*b* is no longer received in the bore 260 of the tensioner body 257. The tensioner body 257 no longer applies a tensioning force to oppose the force applied by the tension ring 222 on the restraining arms RA201-208. The tension ring 222 causes the restraining arms RA201-208 to move into or toward the closed condition, here by hingeably pivoting around their base connector 262. The target aerial vehicle 230 is captured by the capture device 210 in the closed condition, as shown in FIG. 42.

Figure 42:
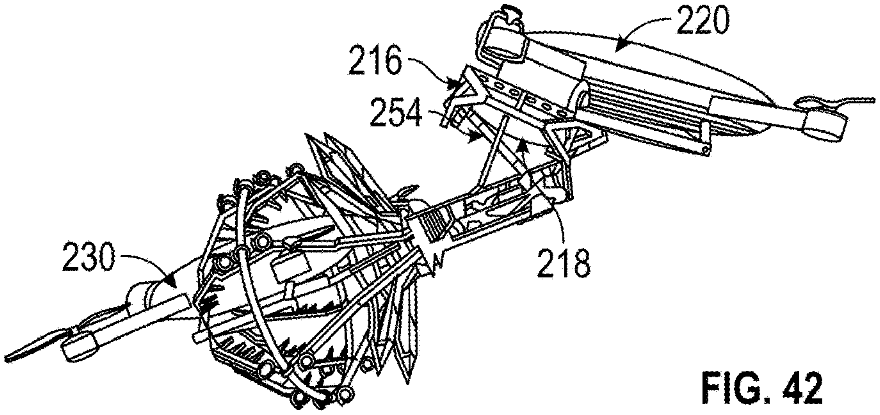
FIG. 42 shows the target aerial vehicle and the host aerial vehicle with the capture device of FIG. 41, in-use, after engagement of the capture device with the target aerial vehicle, and the device body of the capture device being partially detached from the support of the host aerial vehicle.
Figure 43:
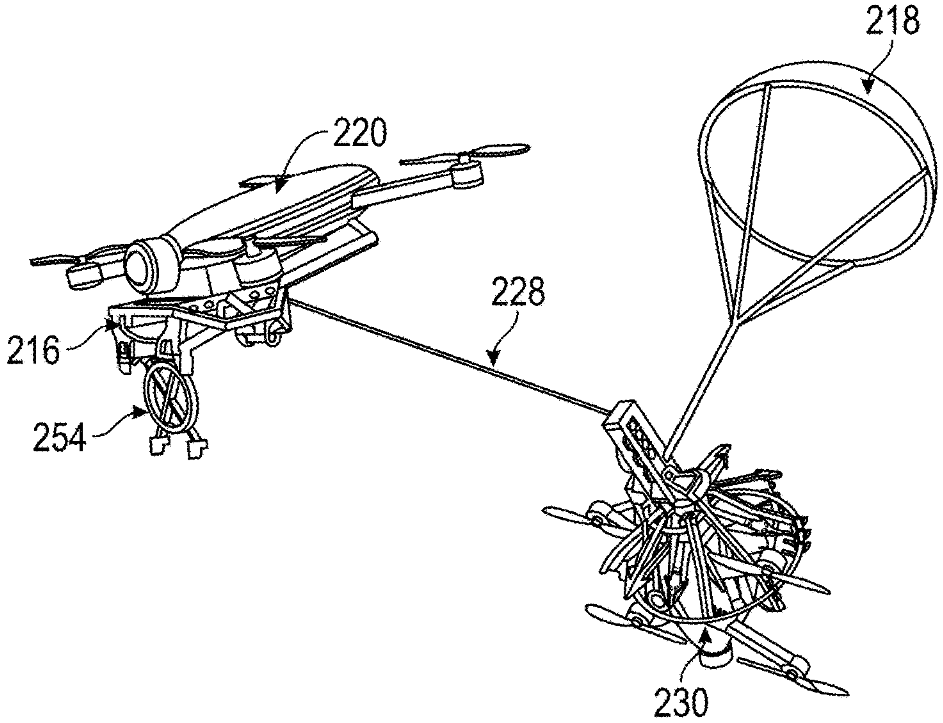
FIG. 43 shows the target aerial vehicle and the host aerial vehicle with the capture device of FIG. 42, in-use, after deployment of the parachute and with the host aerial vehicle towing the capture device and captured target aerial vehicle.

As the parachute 218 is connected to the device body 212, movement of the device body 212 away from the support 216 causes the parachute 218 to exit the support 216 and deploy, as shown in FIG. 42. The partition member 254 is hingeably moved, preferably by the parachute 218, to enable the parachute 218 to exit the support 216.

The tether 228 is also deployed so as to connect the capture device 210 to the host aerial vehicle 220. The tether 228 enables the host aerial vehicle 220 to tow the capture device 210 and any captured target aerial vehicle 230 to a desired location, such as a safe landing position. The tether 228 also enables the host aerial vehicle 220 to counter any effects of air movements, such as wind or downwash from a plane.

Whilst a number of embodiments have been described above, the skilled addressee will appreciate that many other embodiments withing the scope of the invention may be contemplated. For example, in another embodiment the parachute has a whistle attached to emit a noise when falling after the capture of a target aerial vehicle. In other embodiments, the body may have means or an element or portion to make it easier to locate after capture such as a blinking LED, or a noise emitting device, a radio emitter, and/or or a radio transmitter/GPS that would broadcast its GPS coordinates. In another embodiment, the capture trigger may include a proximity sensor instead of or in addition to a trigger plate. Activation of the mechanism is performed when the proximity sensor detects a target aerial vehicle within range. In a further embodiment, activation of the mechanism may be controlled remotely. The capture device and/or host aerial vehicle may for instance, comprise a receiver or transceiver. The user may emit a command to activate the mechanism, such as via a switch or button. The command may be transmitted via a transceiver or emitter. The command may also be transmitted via a software application on a personal computing device, like a smartphone. In an alternative embodiment, a single arm may be provided. Such an arm may capture a target aerial vehicle by spearing the target aerial vehicle. Alternatively, the single arm may have pincers, or a grabber. In another alternative, a single, spiral arm may be provided which can close around a target aerial vehicle by tightening the spiral.

In any of the above embodiments, the capture device may be 3D printed, in other words, formed by additive manufacturing. Any of the features and caveats that apply to any one of the above embodiments may easily be provided or applicable to any of the other embodiments.

Whilst a preferred shape may have been specified for any of the above-described features, any alternative shape may be envisioned in any of transverse or lateral cross-section, longitudinal cross-section, in side view, or in plan view. The shape may be any or any combination of: curved, part curved, non-curved, linear, part linear, non-linear, a broken line, any polygon, whether regular or irregular, having one or more chamfered and/or rounded corners, a triangle, a quadrilateral, such as a square, a rectangle, a trapezium, a trapezoid, a pentagon, a hexagon, a heptagon, an octagon, or any other polygon, a cross, an ellipse, a circle, part circular, an oval, or any abstract shape.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. An aerial vehicle capture device, the capture device comprising a capture mechanism comprising a plurality of restraining arms, which are deployed on contact of an associated capture trigger with the target aerial vehicle, and in which the restraining arms are deployed from a nominal condition to a capture condition on contact of the associated capture trigger with the target aerial vehicle to restrain the target aerial vehicle, each restraining arm being formed with a plurality of backward facing fingers disposed along at least part of each restraining arm, the backward facing fingers extending into a space defined between the plurality of restraining arms.

2. The aerial vehicle capture device according to claim 1, in which the capture trigger is associated with the capture device or with a host drone or other host aerial vehicle to which the capture device is connected.

3. The aerial vehicle capture device according to claim 1 in which the capture trigger is mechanically actuated by impact with the target aerial vehicle, to deploy restraining arms to the capture condition.

4. The aerial vehicle capture device according to claim 1 in which the capture trigger includes a proximity sensor which causes deployment of the restraining arms to the capture condition when the target is detected.

5. The aerial vehicle capture device according to claim 1 in which the capture trigger can be actuated remotely by a user to deploy the restraining arms to the capture condition.

6. The aerial vehicle capture device according to claim 1, and in which the capture device is connected with a host drone or other host aerial vehicle, in which the actuation of the capture trigger triggers separation of the capture device and the restrained target aerial vehicle from a host drone or other host aerial vehicle to which the capture device is connected.

7. The aerial vehicle capture device according to claim 1, which comprises a parachute which is deployed after the aerial vehicle to be captured is restrained, to slow the descent of a captured target aerial vehicle and the capture device.

8. The aerial vehicle capture device according to claim 7 in which the parachute is located prior to deployment between the capture device and a connected host drone or other host aerial vehicle.

9. The aerial vehicle capture device according to claim 1 comprising three to twelve restraining arms.

10. The aerial vehicle capture device according to claim 1 in which the arms are formed to inhibit release of a captured aerial vehicle.

11. The aerial vehicle capture device according to claim 1, wherein the capture mechanism comprises a frame and a slider which can be moved relative to the frame, and a biasor.

12. The aerial vehicle capture device according to claim 11, wherein the biasor includes a spring.

13. The aerial vehicle capture device according to claim 12, wherein the spring is a tension spring.

14. A combination of the aerial vehicle capture device according to claim 1 and a host drone or other host aerial vehicle.

15. The combination as claimed in claim 14, further comprising a tether.

16. A method of capturing a target aerial vehicle, the method comprising providing the combination according to claim 14, the method comprising bringing the combination into contact with the target aerial vehicle whereby the capture trigger is actuated to deploy the restraining arms from a nominal condition to a captive condition to restrain the target aerial vehicle.

17. The method according to claim 16 in which the capture device together with the captured target aerial vehicle detaches from the host drone or other host aerial vehicle.

18. The method according to claim 16, in which a parachute is deployed to restrain the descent of the capture device and captured target aerial vehicle.

* * * * *